(12) United States Patent
Yoneno

(10) Patent No.: US 6,317,118 B1
(45) Date of Patent: Nov. 13, 2001

(54) REMOTE COORDINATE INPUT DEVICE AND REMOTE COORDINATE INPUT METHOD

(75) Inventor: Kunio Yoneno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/188,146

(22) Filed: Nov. 9, 1998

(30) Foreign Application Priority Data

Nov. 7, 1997 (JP) .................................................... 9-306171

(51) Int. Cl.$^7$ ....................................................... G09G 5/08
(52) U.S. Cl. ............................ 345/158; 345/156; 353/42
(58) Field of Search ................................. 345/39, 44, 45, 345/46, 156–168, 169; 353/101, 42; 359/142, 146

(56) References Cited

U.S. PATENT DOCUMENTS

| | | | |
|---|---|---|---|
| 5,235,363 | * | 8/1993 | Vogeley et al. ....................... 353/122 |
| 5,363,120 | * | 11/1994 | Drumm .................................. 345/158 |
| 5,448,261 | * | 9/1995 | Koike et al. .......................... 345/158 |
| 5,453,758 | * | 9/1995 | Sato ..................................... 345/158 |
| 5,504,501 | * | 4/1996 | Hauck et al. ......................... 345/158 |
| 5,554,980 | * | 9/1996 | Hashimoto et al. ............. 340/825.72 |
| 5,644,126 | * | 7/1997 | Ogawa .............................. 250/231.1 |
| 5,712,658 | * | 1/1998 | Arita et al. ........................... 345/158 |
| 5,738,429 | * | 4/1998 | Tagawa et al. ...................... 353/122 |
| 5,782,548 | * | 7/1998 | Miyashita .............................. 353/42 |
| 5,949,402 | * | 9/1999 | Garvin et al. ........................ 345/156 |
| 5,949,403 | * | 9/1999 | Umeda et al. ....................... 345/157 |
| 5,963,145 | * | 10/1999 | Escobosa ......................... 340/825.72 |
| 5,973,672 | * | 10/1999 | Rice et al. ........................... 345/158 |
| 5,982,352 | * | 11/1999 | Pryor .................................. 345/156 |

FOREIGN PATENT DOCUMENTS

| | | | |
|---|---|---|---|
| 402230694A | * | 9/1990 | (JP) . |
| 2-300816 | | 12/1990 | (JP) . |
| 5-19953 | | 1/1993 | (JP) . |

* cited by examiner

Primary Examiner—Bipin Shalwala
Assistant Examiner—Ricardo Osorio
(74) Attorney, Agent, or Firm—Oliff & Berridge PLC

(57) ABSTRACT

The invention prevents an audience from being distracted by movements of a demonstrator that are not related to movements of a pointer on a screen, and by the demonstrator moving away from the screen, during a presentation which is performed by enlarging and projecting the display of a personal computer onto the screen by a projector. A designating tool, which is held by the hand of the demonstrator, is imaged by an imaging part which is disposed at the top of the screen. On the front of the designating tool, infrared LEDs are disposed at each vertex of an isosceles triangle, and recessed at the center, and the orientation of the designating tool is obtained from the positional relationship of the infrared LEDs of an image which has been imaged by the imaging part. This orientation is converted to planar coordinates and is sent to a computer, a marker is displayed on a screen, and the software is operated.

7 Claims, 25 Drawing Sheets

REMOTE COORDINATE INPUT DEVICE AND REMOTE COORDINATE INPUT METHOD

BACKGROUND OF THE INVENTION

1. Field of Invention

The present invention relates to a remote coordinate input device and input method used when either designating a specified portion on a screen, or operating application software when performing a presentation by projecting an enlarged display of a computer screen onto a screen using a projector.

2. Description of Related Art

In a conventional presentation, information is displayed on a large screen by projecting an enlarged display of a transparent-type document using an OHP (overhead projector), or by projecting an enlarged film image using a slide projector. A demonstrator conducts the presentation while designating important points of the projected image using a pointing stick or a laser pointer.

Moreover, in recent years, due to the wide distribution of personal computers and liquid crystal projectors, effective presentations have been performed using various application software that have been developed for presentations.

However, a mouse or similar device which is connected to the computer must be operated in order to display the screen. In order to operate the mouse or similar device, the demonstrator must move away from being in front of the screen. Unfortunately, this movement by the demonstrator and the movement of the pointer on the screen are not related to each other. Thus, the audience is sometimes distracted.

In order to avoid this problem, devices which do not restrict the position of the demonstrator when the demonstrator is operating the computer, and which allow the operator to operate the application software by directly operating on the screen from a comparatively free position, and which can input so-called remote coordinates are being developed, and various corresponding methods have also been developed.

As one example of these methods, Japanese Patent Laid-Open Publication No. Hei 5-19953 discloses a method of controlling displayed information by operating a remote control device from a position which is distant from the screen. However, the operation is only performed by various kinds of keys that are provided on the remote control device. For example, in order to move the pointer on the screen, arrow keys have to be pressed. However, in this method, the pointer only moves integratedly, which provides a different feel than one gets from pointing by using a pointing stick.

Moreover, Japanese Patent Laid-Open Publication No. Hei 2-300816 discloses a method in which three light emitting elements are provided on a designating part. Each light emitting element radiates light in a different direction. The angle of orientation of the designating part is detected by the difference in strength of the light received by the light receiving elements from the light radiated from the light emitting elements. However, since the light has to be modulated in order to distinguish the light emitting elements, the apparatus is subject to problems, such as the designating part becoming complicated and it being easily influenced by external noise because the device uses the light amount difference.

Moreover, both of these methods have difficulty in distinguishing between two points or more that are simultaneously designated by the demonstrator and another person, such as someone in the audience.

SUMMARY OF THE INVENTION

It is therefore an object of the invention to solve the above-mentioned problems. The remote coordinate input device in accordance with the invention includes designating means that has at least three first light emitting elements and a second light emitting element that is arranged on an orthogonal axis that is perpendicular to a plane delineated by said first light emitting elements, an imaging means that images a relative positional relationship of said first and second light emitting elements of said designating means, a coordinate converting means that obtains a direction in which said designating means points with respect to said imaging means from a picture signal which is imaged by said imaging means and converts it to a planar coordinate, an output means that outputs the coordinate that is obtained by said coordinate converting means, and a display means that displays designating information on a screen based on said coordinate that is obtained by said output means.

In accordance with another aspect of the remote coordinate input device, said first light emitting elements are respectively arranged at each vertex of an isosceles triangle, and a base of the triangle which connects two of the first light emitting elements is substantially horizontally arranged.

In accordance with another aspect of the remote coordinate input device, said first light emitting elements are respectively arranged at each vertex of a rhombus, and one diagonal line of said rhombus is substantially horizontally arranged.

Another aspect of the remote coordinate input device further includes a modulating means that modulates said first or second light emitting elements according to operating information from an operating means that is provided on said designating means, and a light receiving means that detects the modulated operating information.

Another aspect of the remote coordinate input device further includes a hand detecting means that detects whether said designating means is being held by a hand of the user, and controls lighting or turning off of the light of said first and second light emitting elements by an output of said hand detecting means.

Another remote coordinate input device in accordance with the invention includes a designating means that has at least three first reflecting elements and a second reflecting element that is arranged on an orthogonal axis which is perpendicular to a plane delineated by said first reflecting elements, an irradiating means that irradiates said first and second reflecting elements of said designating means, an imaging means that images a relative positional relationship of said first and second reflecting elements of said designating means, a coordinate converting means that obtains a direction in which said designating means points with respect to said imaging means from a picture signal that has been imaged by said imaging means, and converts it into a planar coordinate, an output means that outputs the coordinate that is obtained by said coordinate converting means, and a display means that displays designating information on a screen based on said coordinate that is obtained from said output means.

In accordance with another aspect of this remote coordinate input device, said first reflecting elements are respectively arranged at each vertex of an isosceles triangle, and a base of the triangle which connects two of the reflecting elements is substantially horizontally arranged.

In accordance with another aspect of this remote coordinate input device, said first reflecting elements are respectively arranged at each vertex of a rhombus and one diagonal line of said rhombus is substantially horizontally arranged.

Another remote coordinate input device in accordance with the invention includes a designating means that has a hollow disk-shaped first reflecting element and a second reflecting element which is arranged on an orthogonal axis that is perpendicular to a plane delineated by said first reflecting element, an irradiating means that irradiates said first and second reflecting elements of said designating means, an imaging means that images a relative positional relationship of said first and second reflecting elements of said designating means, a coordinate converting means that obtains a direction in which said designating means points with respect to said imaging means from a signal which has been imaged by said imaging means and converts it to a planar coordinate, an output means that outputs the coordinate that is obtained by said coordinate converting means, and a display means that displays designating information on a screen based on said coordinate that is obtained by said output means.

A remote coordinate input method in accordance with the invention includes the steps of obtaining a first image with a first light emitting element or a first reflecting element, obtaining a second image with a said second light emitting element or a second reflecting element, obtaining a reference coordinate from a coordinate of said first image and a direction with respect to an imaging means of a designating means from the positional relationship of said second image and said reference coordinate, and specifying a designating position in a display means according to said direction.

Another aspect of the remote coordinate input method further includes obtaining independent designating tool images in which an image of a plurality of designating means is separated into independent images from the image which has been imaged by said imaging means, obtaining a direction with respect to said imaging means of said designating means for every independent designating tool image, and specifying a designated position by said display means according to said directions.

DETAILED DESCRIPTION OF PREFERRED EMBODIMENTS

The first embodiment of the present invention is explained based on the drawings.

Figure 1:
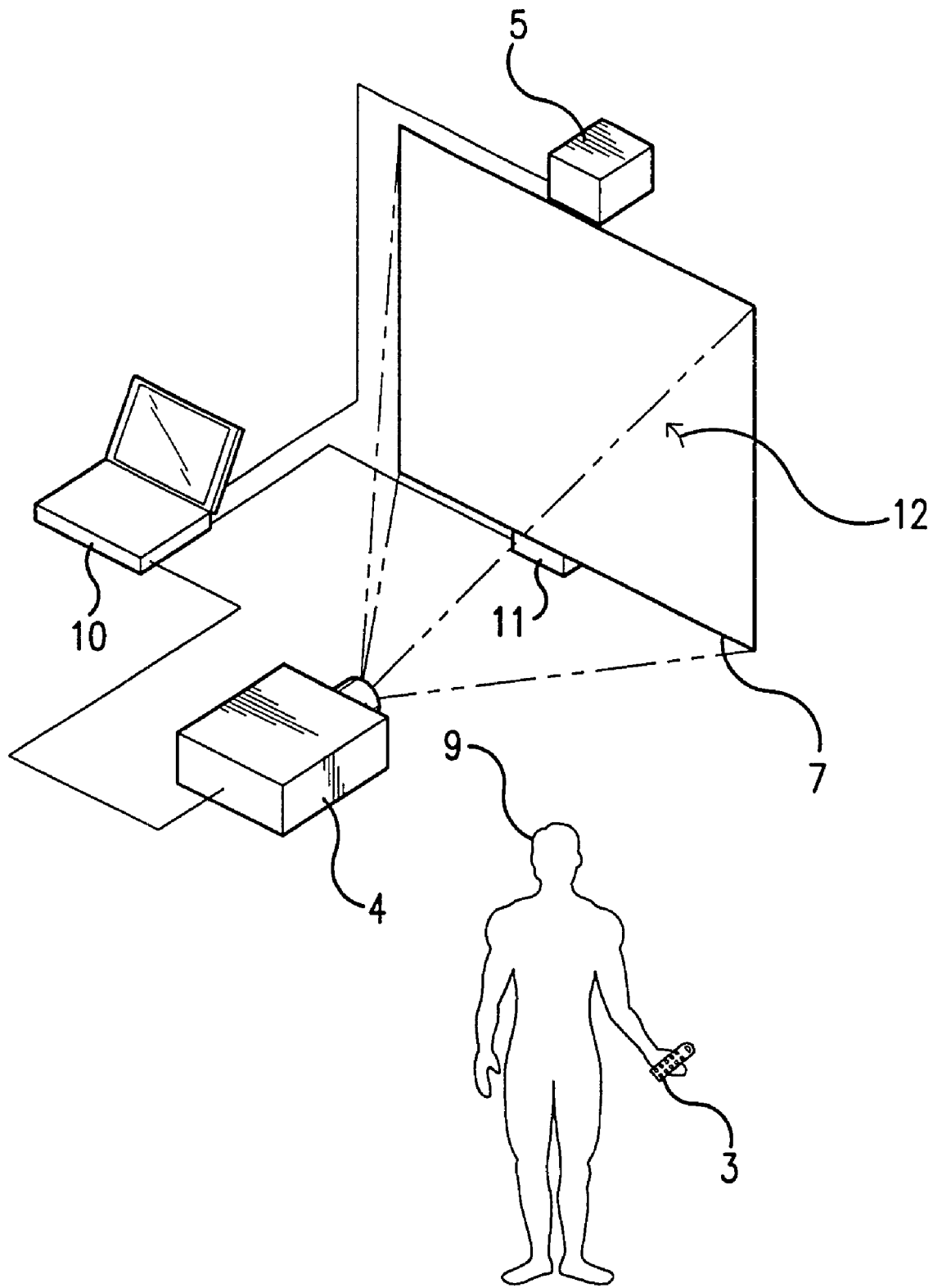
FIG. 1 is a diagram showing a first embodiment of the present invention.

FIG. 1 shows a first embodiment of the present invention. Display data of a computer 10 is sent to a projector 4, projected, enlarged, and displayed on a screen 7.

An imaging part 5 is provided at the top of the screen 7. The imaging part 5 images a designating tool 1, which is held by a demonstrator 9, detects the orientation of the designating tool 1, converts it into coordinates and transfers it to the computer 10. A receiver 11 is provided at the bottom of the screen 7, which detects a specified signal from the designating tool 1 and transfers it to the computer 10.

During a presentation, the position of the marker 12 can be shifted by changing the orientation of the designating tool while the demonstrator 9 is watching the screen.

The marker 12 is the same as a pointer or a cursor that is operated by a conventional mouse. When the orientation of the designating tool 1 is changed, the marker 12 is shifted, which is similar to the movement of a pointer or cursor when the mouse is shifted on its corresponding plane.

Figure 2:
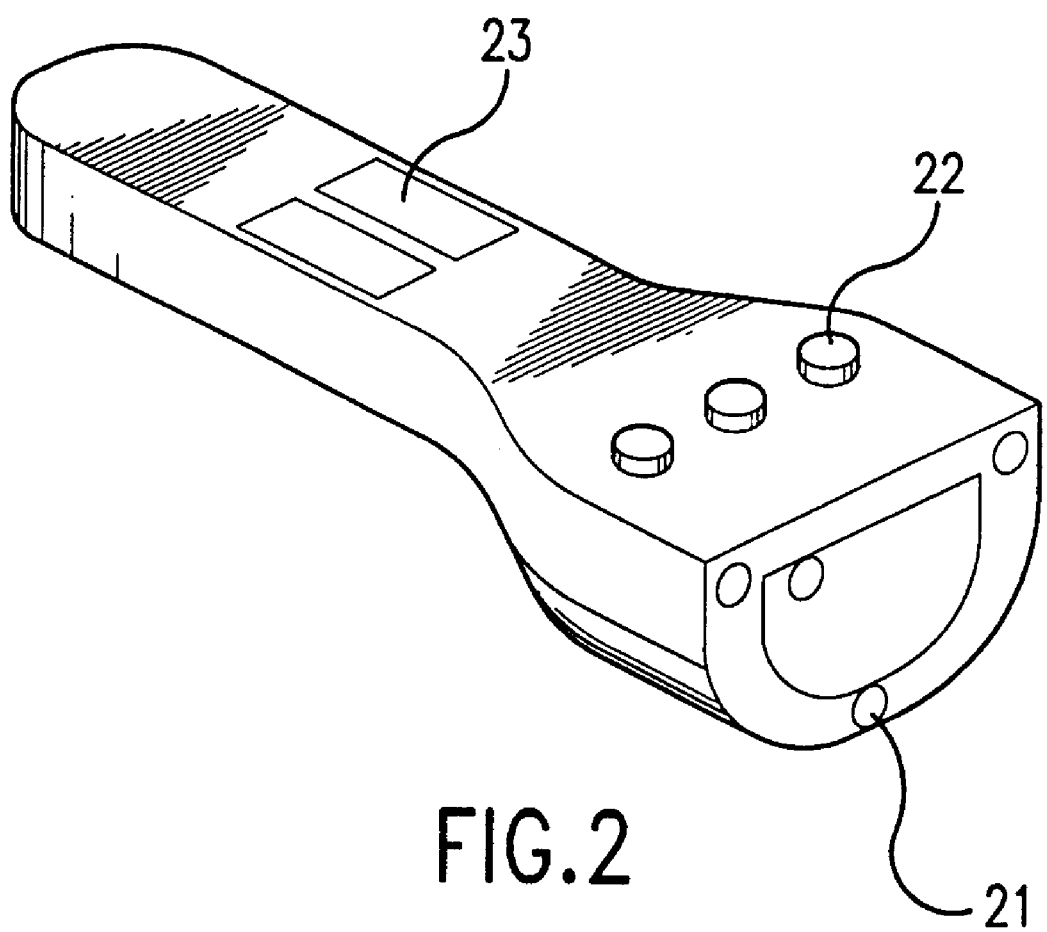
FIG. 2 is a diagram showing one example of a designating tool of the first embodiment of the present invention.

One example of the designating tool 1 is shown in FIG. 2. A plurality of infrared LEDs (light emitting diodes) 21 that irradiate infrared rays are provided on a front face. Operating buttons 22 are provided on a top surface. Hand detecting electrodes 23 are provided on a portion which is held by a hand of the demonstrator. Moreover, batteries, which are not shown in the figure, are housed inside the designating tool 1.

Figure 3:
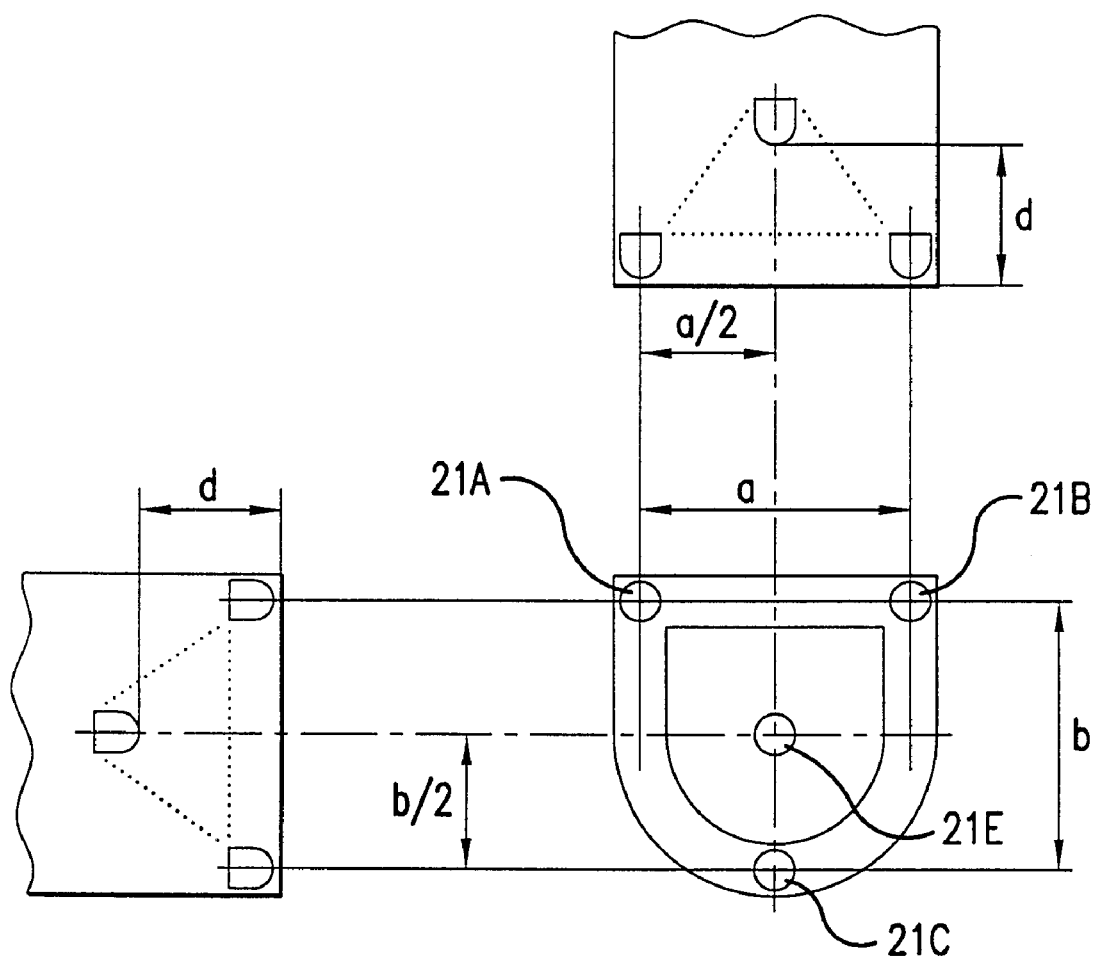
FIG. 3 is a three-face-view explaining the details of a front part of the designating tool of the first embodiment of the present invention.

FIG. 3 is a three-face-view which shows details of the front face of the designating tool 1. The infrared LEDs 21A, 21B and 21C, which are the first light emitting elements, are disposed in the same plane at vertices of an isosceles triangle. The infrared LEDs 21A and 21B are separated by a distance "a". The line connecting LEDs 21A and 21B is parallel to the top surface of the designating tool 1. The infrared LED 21C is separated by a distance "b" in the vertical direction from the center of the line which connects LEDs 21A and 21B. An infrared LED 21E, which is the second light emitting element, is separated by a distance "b/2" in the vertical direction from 21C in the front face, and is disposed at a position which is recessed by a distance "d" inside the designating tool 1. It is not necessary for LED 21E to be disposed at a position on a line which is perpendicular to the plane which is delineated by LEDs 21A, 21B and 21C. However, compactness of the device can be obtained by arranging it as shown in FIG. 3.

When the demonstrator 9 holds the designating tool 1, a hand detecting electrode 23 detects the fact that the demonstrator 9 is holding the designating tool 1, lights the infrared LEDs 21 (21A, 21B, 21C and 21E), and turns the lights off when the demonstrator 9 removes his or her hand. Moreover, when one of the operating buttons 22 is pressed, the infrared LEDs 21 are all turned off at once, and the information of the operating button 22 that is pressed is transmitted via timed flashes that correspond to a predetermined code of the operating button 22. The transmitted code is received by the receiver 11 and is sent to the computer 10. When the transmission is completed, all the LEDs are lit again. Moreover, it is possible to assign functions to the operating buttons 22, such as a function that corresponds to click button of a normal mouse, and a function which corresponds to application software which is used in the computer 10.

Figure 4:
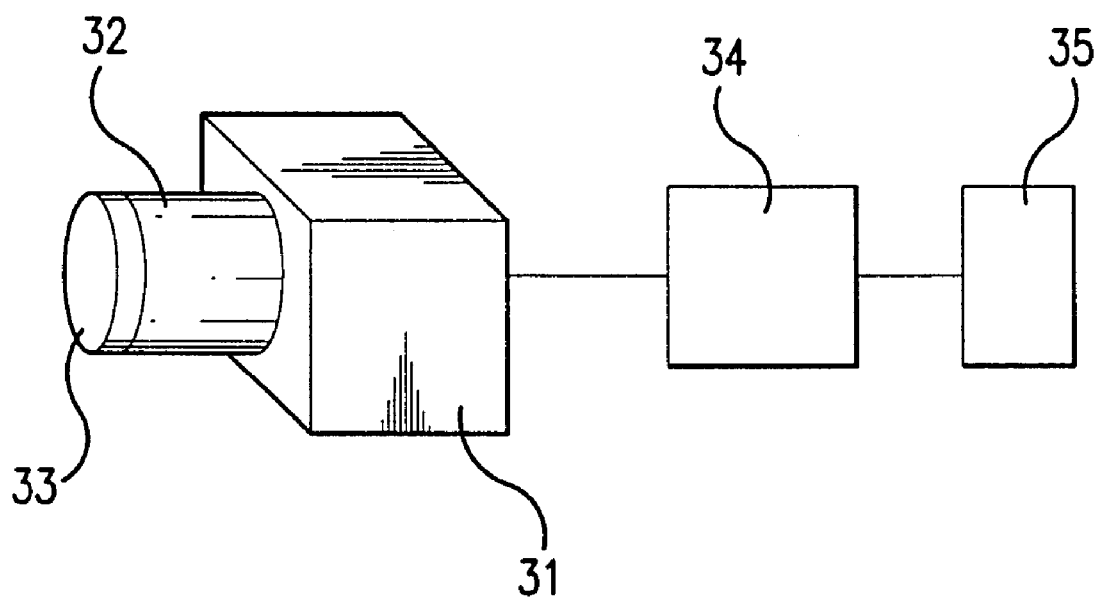
FIG. 4 is a diagram showing one example of an imaging part of the first embodiment of the present invention.

Next, one example of the imaging part 5 is shown in FIG. 4. A lens 32 and an infrared ray filter 33 are provided in a CCD camera 31, and an image of the infrared LED 21 of the designating tool 1 is imaged. The output of the CCD camera 31 is connected to an image processor 34. The image processor 34 calculates the planar coordinates on the screen 7 based on the image of LED 21 of the designating tool 1 which has been imaged by the CCD camera 31, and sends the planar coordinates to the computer 10 via an output part 35.

Figure 5:
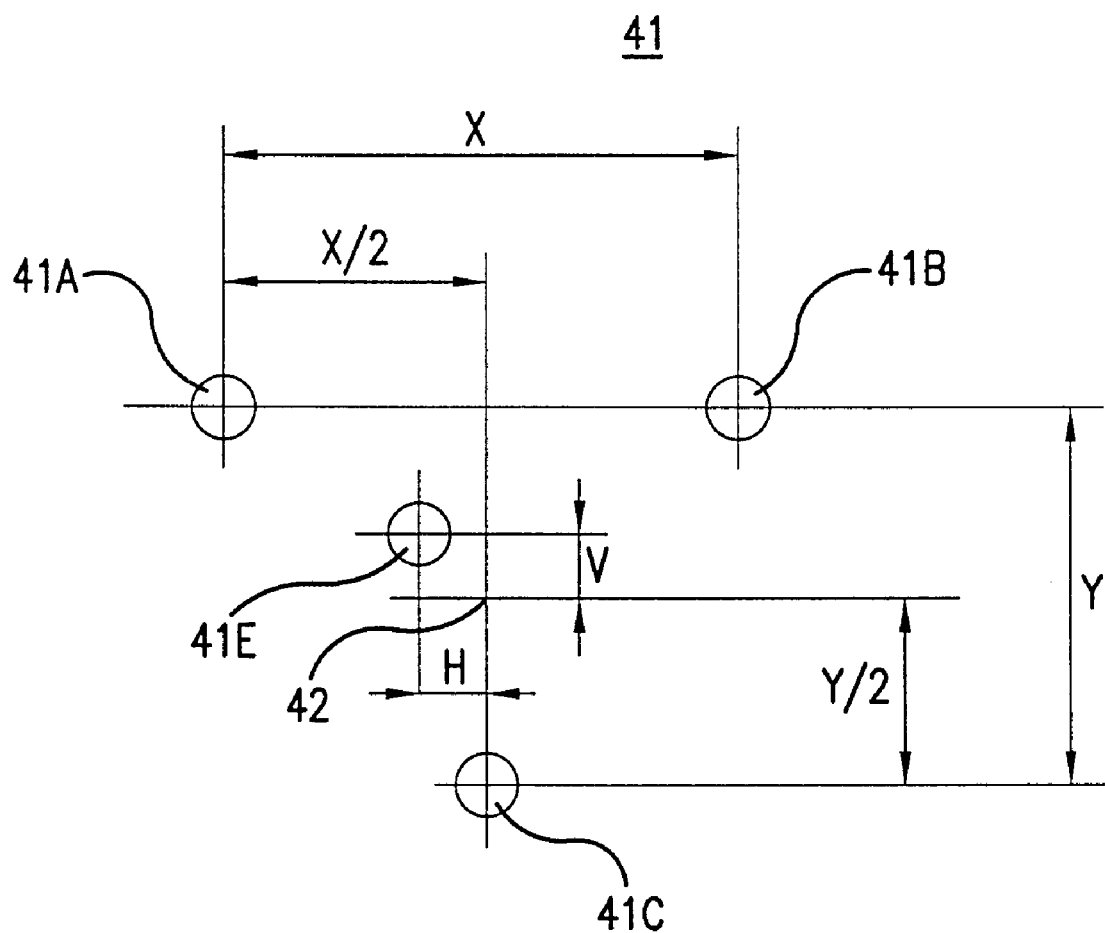
FIG. 5 is a diagram showing one example of an output image of a CCD camera of the first embodiment and a second embodiment of the present invention.

One example of the output image of the CCD camera 31 is shown in FIG. 5. Since the infrared ray filter 33 is disposed in front of the lens 32 of the CCD camera 31, light of interior illuminations or the like is substantially entirely removed, and only the images 41 from the LEDs 21 are output, as shown in FIG. 5.

Here, the appearance of images 41 from the designating tool 1 is explained with reference to the figures.

Figure 6:
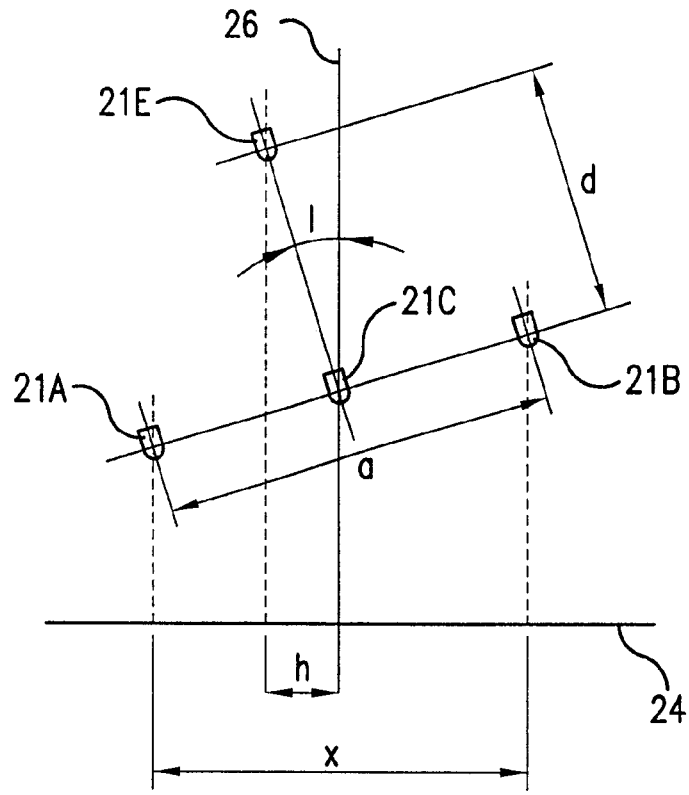
FIG. 6 is a plan view showing the positions of LEDs of the designating tool of the first embodiment of the present invention.

FIG. 6 is a plan view in which the LEDs 21 of the designating tool 1 are viewed from the top part. The center line 26 connects a midpoint between the infrared LEDs 21A and 21B, and the lens 32. FIG. 6 shows the case when the designating tool 1 faces a left diagonal direction by an angle l from the center line 26. When the projection plane 24 is assumed along lines extending perpendicularly from the center line 26, the space between the infrared LEDs 21A and 21B becomes "x" in the projection plane 24, and the infrared LED 21E is projected as being shifted by "h" from the center line to the left.

Figure 7:
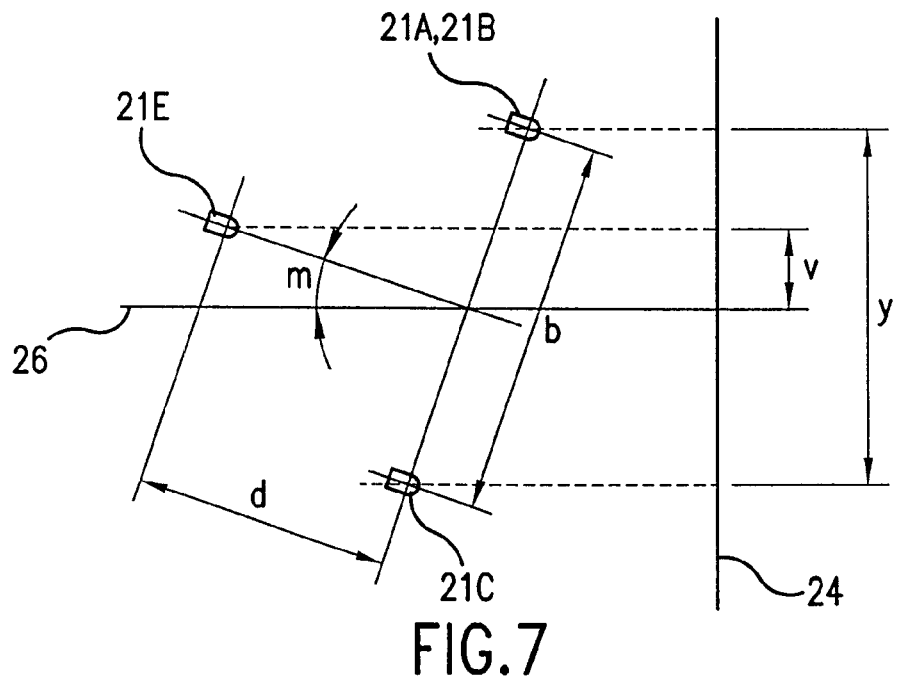
FIG. 7 is a side view showing positions of the LEDs of the designating tool of the first embodiment of the present invention.

FIG. 7 is a side view of the LEDs 21 of the designating tool 1. The center line 26 connects a midpoint between the infrared LEDs 21A, 21B and 21C and the lens 32. FIG. 7 shows a case when the designating tool 1 faces a downward diagonal direction at an angle "m" from center line 26. When the projection plane 24 is assumed along lines extending perpendicularly from the center line 26, in the projection plane 24, the space between the infrared LEDs 21A, 21B and 21C becomes "y", and the infrared LED 21E is projected as being shifted upward by a distance "v" from the center line.

Here, the images 41 which have been imaged by the CCD camera 31 can be considered as images which have been imaged at an arbitrary magnification at the projection plane 24 of FIGS. 6 and 7. Therefore, the images 41 of FIG. 5 have the same geometrical relationships as the projected images in the projection plane 24. In FIG. 5, images 41A, 41B, 41C and 41E are the images of infrared LEDs 21A, 21B, 21C and 21E, respectively. Moreover, the distance between the images 41A and 41B is "X", the distance from the center of a line which connects 41A and 41B to the image 41C in the vertical direction is "Y", the position which is a distance Y/2 above the image 41C is a reference point 42, the horizontal component of the distance between the image 41E and the reference point 42 is H, and the vertical component of the distance between the image 41E and the reference point 42 is V. Since the reference point 42 lies on an extension of the center line 26, each value of x, h, y and v of FIGS. 6 and 7 becomes proportional to the respective value of X, H, Y or V of FIG. 5. Accordingly, when the relationships between images 41A, 41B, 41C and 41E of the images 41 are checked, it is possible to find out how much the designating tool 1 is inclined horizontally and vertically with respect to the lens 32.

$$x = a\cos l \qquad \text{[Equation 1]}$$

$$h = d\sin l$$

$$\therefore \frac{h}{x} = \frac{d}{a}\tan l$$

$$\therefore l = \tan^{-1}\left(\frac{a}{d}\frac{h}{x}\right)$$

$$y = b\cos m \qquad \text{[Equation 2]}$$

$$v = d\sin m$$

-continued $$\therefore \frac{v}{y} = \frac{d}{a}\tan m$$

$$\therefore m = \tan^{-1}\left(\frac{b}{d}\frac{v}{y}\right)$$

Equation 1 is an equation which shows the relationship of a horizontal direction of the projection plane 24. Moreover, equation 2 is an equation which shows the relationship of a vertical direction of the projection plane 24. As described above, each value of x, h, y and is v is proportional to each respective value of X, H, Y and V. Therefore Equations 1 and 2 can be described as Equation 3 as follows:

$$l = \tan^{-1}\left(\frac{a}{d}\frac{H}{X}\right) \quad \text{[Equation 3]}$$

$$m = \tan^{-1}\left(\frac{b}{d}\frac{V}{Y}\right)$$

Here, since the values of a, b and d are already known values of the designating tool 1, the angles l and m can be obtained from the images 41 of FIG. 5.

Moreover, the data which is output to the computer 10 from the output part 35 provides horizontal and vertical orthogonal coordinates of the plane which is projected onto the screen 7. Therefore, when the center of the screen is the point of origin, as shown in Equation 4, the angles l and m can be converted into the coordinates Xs, Ys.

$$Xs = K\tan l \quad \text{[Equation 4]}$$

$$= K\frac{a}{d}\frac{H}{X}$$

$$Ys = K\tan m$$

$$= K\frac{b}{d}\frac{V}{Y}$$

Here, K of Equation 4 is a proportional constant and is a value to determine an inclination of the designating tool 1 and the sensitivity of the output. This value can be fixed as an appropriate value which is easy to use, or can be set corresponding to the preference of the demonstrator 9. Moreover, as demonstrated by Equation 4, the values of the angles l and m do not need to be obtained in the actual calculation.

Next, according to the above-mentioned principles, in the image processing device, a method of obtaining coordinates on the screen which are designated by the designating tool 1 from the image 41 imaged by the CCD camera 31 is explained with reference to the flowchart of FIG. 8.

In S1, the center of balance coordinate of the images 41A, 41B, 41C and 41E is obtained. This is to determine an approximately centered position as a representative point since the image has a limited size, and it can be obtained by a commonly known calculation method. More accurate coordinates can be calculated when the center of balance coordinates are determined when considering the difference of brightness due to the distance of each LED from the imaging part being slightly different.

In S2, the distance X of the horizontal direction and an intermediate coordinate between 41A and 41B are obtained from the center of balance coordinates of images 41A and 41B.

In S3, the distance Y of the vertical direction and the coordinate of the reference point 42, which is the midpoint of both the distance X and the distance Y, are obtained from the coordinates which were obtained in S2 and the center of balance coordinates of the image 41C.

In S4, the center position of image 41E, and the horizontal distance H and the vertical distance V of the reference point 42 are obtained.

In S5, the coordinates Xs and Ys on the screen 7 are obtained by Equation 4.

In summary, a method of obtaining the above-mentioned coordinates includes the steps of obtaining the distances X and Y and the reference point 42 from the images 41A, 41B and 41C of the infrared LEDs 21A, 21B and 21C, which are the first light emitting elements of the designating tool 1, obtaining horizontal and vertical distances H and V of the reference point 42 from the image 41E of the infrared LED 21E, which is the second light emitting element, and obtaining the coordinates Xs and Ys on the screen 7 by a calculation.

Moreover, here, the center position is the point of origin of the coordinates on the screen. However, it is possible to make a peripheral part of the screen the point of origin by providing a bias value.

Figure 27:
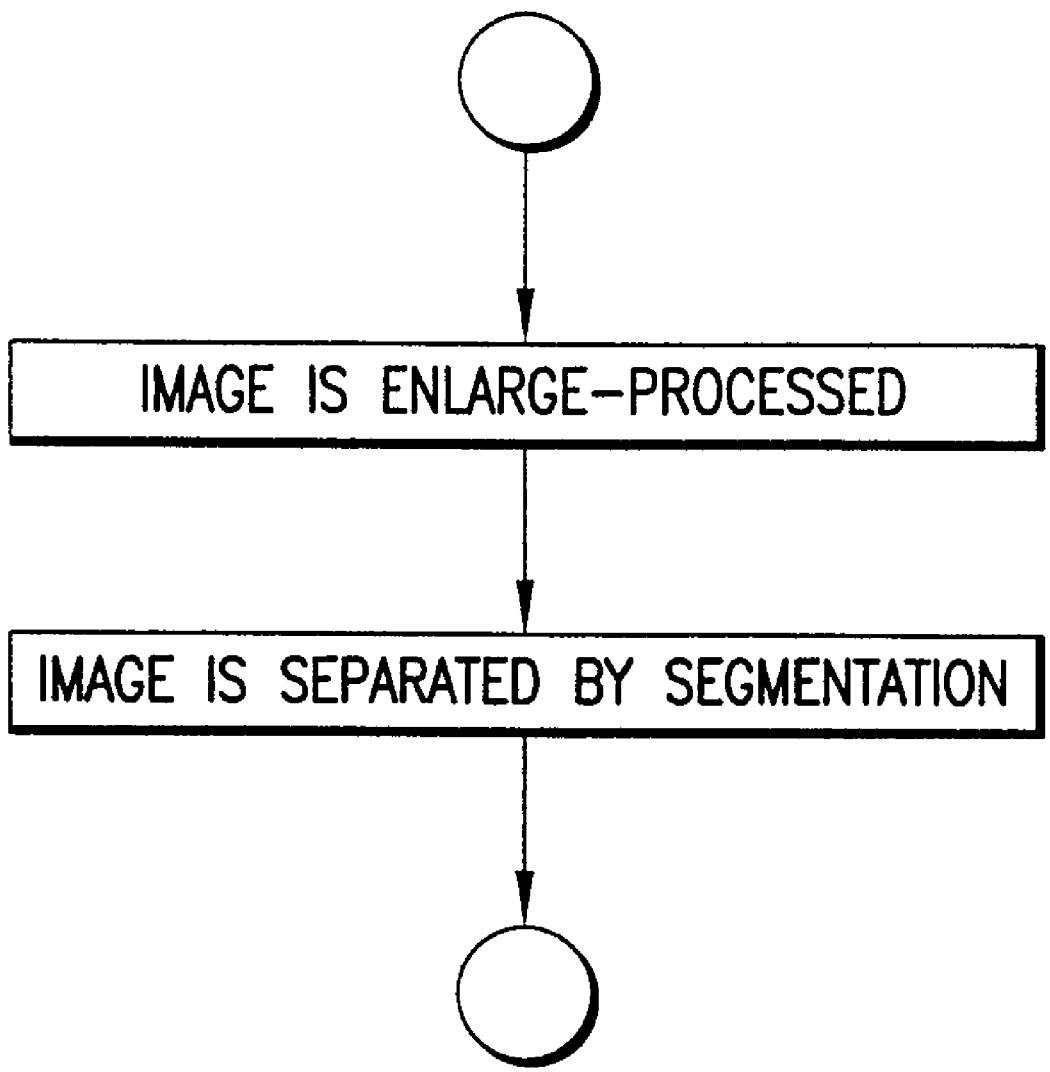
FIG. 27 is a flow chart showing a procedure which divides a plurality of images of the designating tool of the first, second, and third embodiments of the present invention.

The case of using only one designating tool 1 is explained above. However, a method of obtaining the coordinates on the screen designated by respective designating tools when a plurality of designating tools are simultaneously used is explained below with reference to the flowchart of FIG. 27.

In S1, the image is enlarged and processed for each image. It is acceptable to perform processing to fill in the periphery of the portion in which the image exists with the same signal in accordance with a predetermined size.

Next, in S2, the area of the image for each designating tool is obtained by performing segmentation.

Figure 8:
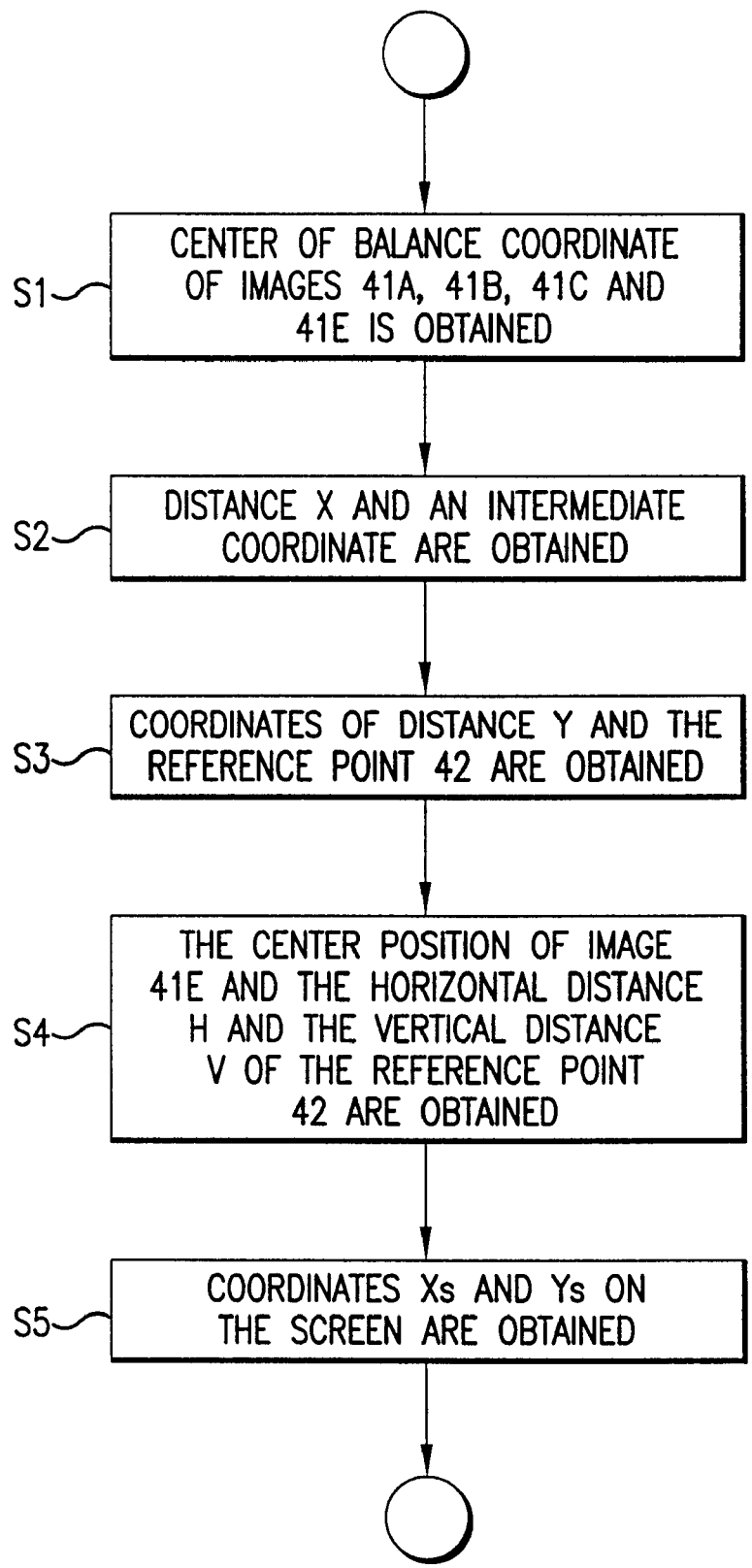
FIG. 8 is a flow chart showing a procedure of obtaining the coordinates in accordance with the first and second embodiments of the present invention.

Since an area of the image for every designating tool is obtained as stated above, it is acceptable to obtain a coordinate in the area for each image with reference to the flowchart which is shown in FIG. 8.

Figure 9:
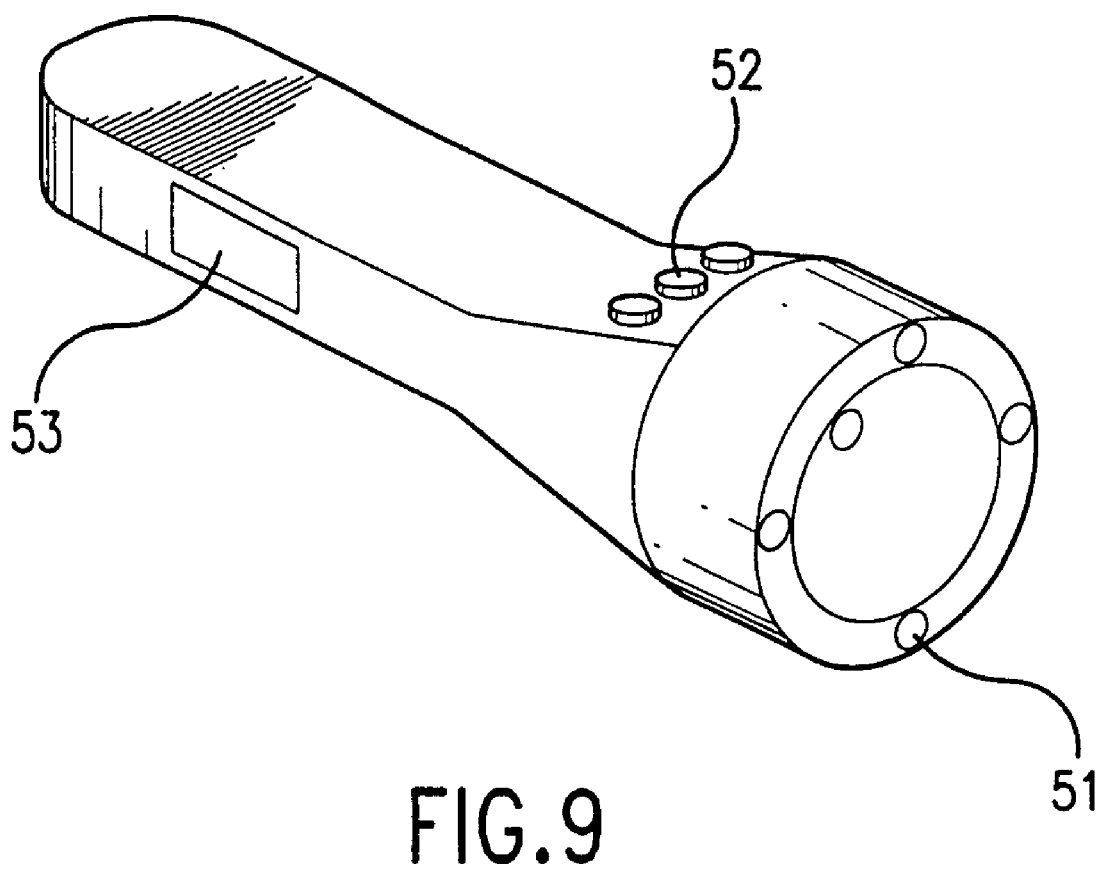
FIG. 9 is a diagram showing another example of a designating tool of the first embodiment of the present invention.

Next, another example of the designating tool 1 is shown in FIG. 9.

A plurality of infrared LEDs (light emitting diodes) 51 that irradiate infrared rays are provided in the front face of the designating tool. Operating buttons 52 are provided on the top surface of the designating tool. A hand detecting switch 53 is provided on the portion which is held by the demonstrator's hand. Moreover, batteries, which are not shown in the figure, are housed inside the designating tool.

Figure 10:
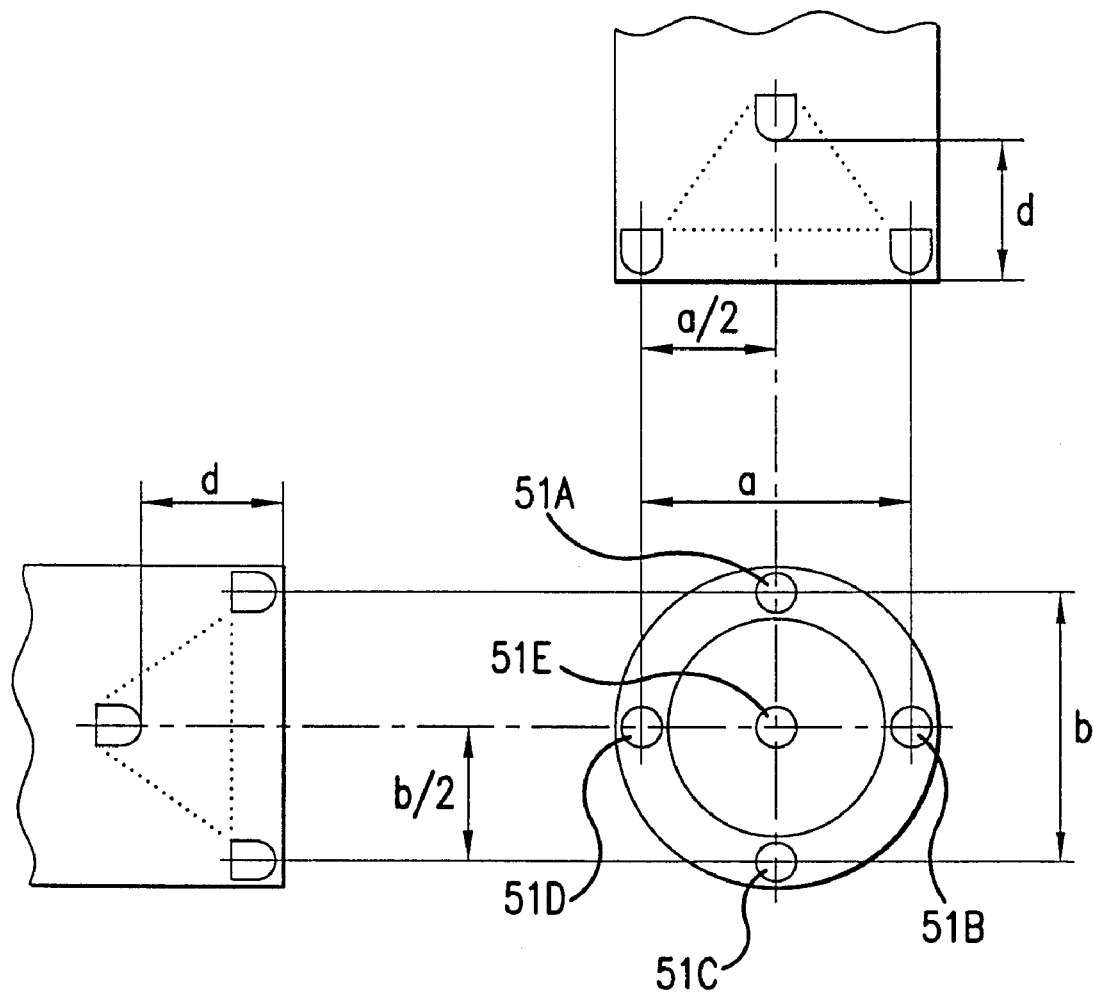
FIG. 10 is a three-face-view showing details of the front part of the designating tool of the first embodiment of the present invention.

FIG. 10 is a three-face-view which shows the details of the front face portion of the designating tool. The infrared LEDs 51A, 51B, 51C and 51D, which are the first light emitting elements, are disposed in a rhombus in the same plane. The infrared LEDs 51B and 51D are separated by a distance "a". A line that connects LEDs 51B and 51D is parallel to the top surface at the demonstrator's hand side of the designating tool 1. Infrared LEDs 51A and 51C are separated by a distance "b" in the vertical direction. The infrared LED 51E, which is the second light emitting element, is disposed at a position which is recessed inside the designating tool housing by distance "d" at the intersection of a straight line which connects LEDs 51B and 51C and a straight line which connects LEDs 51A and 51C in the front view.

When the demonstrator 9 holds the designating tool 1, the hand detecting switch 53 detects the fact that the demonstrator 9 is holding the designating tool in his or her hand, lights the infrared LEDs 51 (51A, 51B, 51C, 51D and 51E), and turns them off when the demonstrator 9 removes his or her hand from the designating tool. Moreover, when the operating button 52 is pressed, the infrared LEDs 51 are all turned off at once, and information of operation button 52 that is pressed is transmitted via timed flashes that correspond to a predetermined code of the operation button 52. The transmitted code is received by the receiver 11 and is sent to the computer 10. When the transmission is completed, all the infrared LEDs are lit again. Moreover, the operation buttons 52 may be assigned the function of a click button of a normal mouse, a function which corresponds to application software which is used in the computer 10, or another function.

Here, the imaging of images 61 that are transmitted by the designating tool 1 is explained with reference to the figures.

Figure 12:
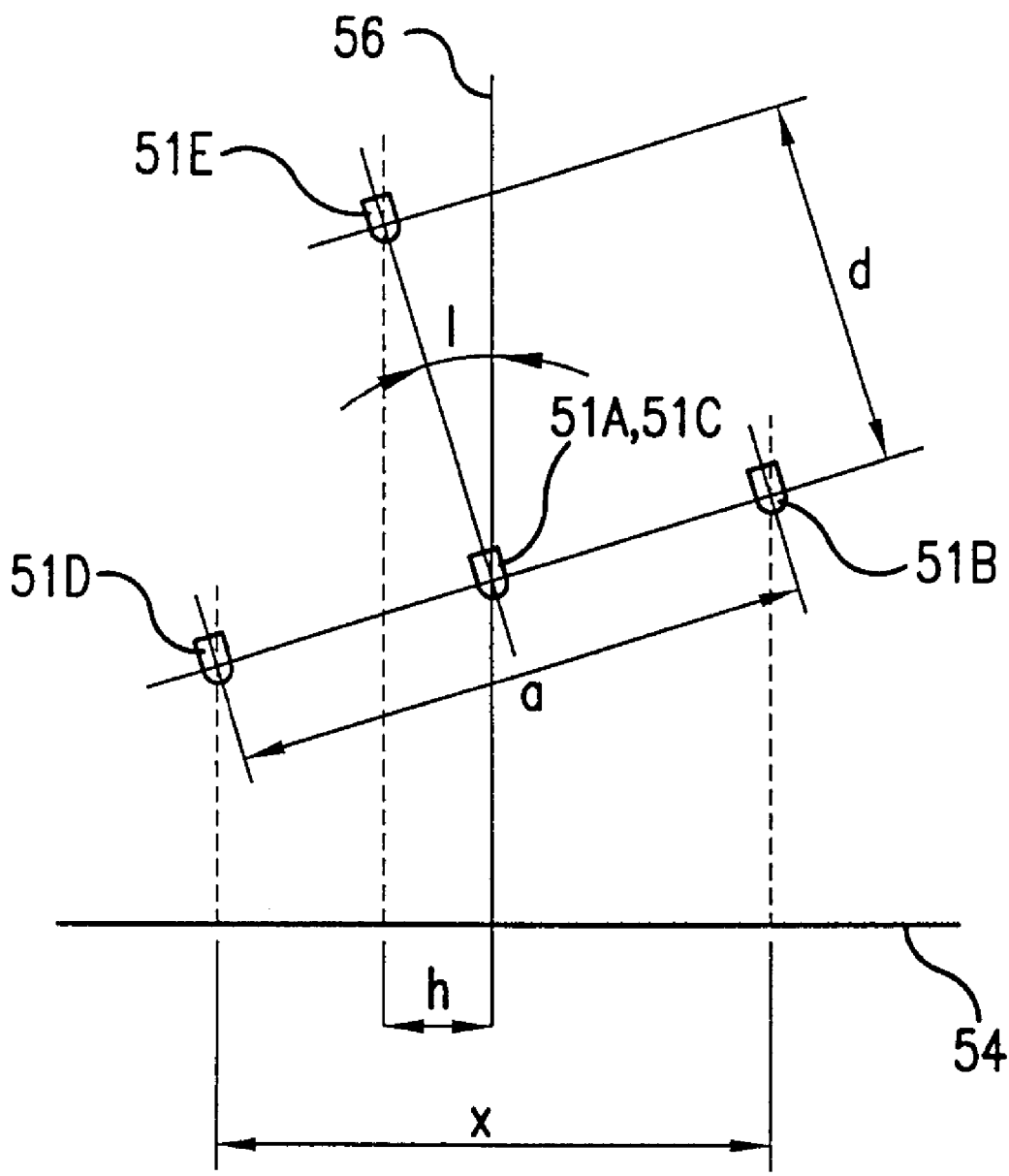
FIG. 12 is a plan view showing positions of the LEDs of the designating tool of the first embodiment of the present invention.

FIG. 12 is a plan view in which the LEDs 51 of the designating tool are viewed from the top. The center line 56 is a straight line which connects a midpoint between the infrared LEDs 51B and 51D, and the lens 32. FIG. 12 shows the case when designating tool 1 faces a left diagonal direction at an angle l from the center line 56. When the projection plane 54 is assumed along lines extending perpendicularly from the center line 56, the space between the infrared LEDs 51B and 51D becomes "x" in the projection plane 54, and the infrared LED 51E is projected as being shifted by a distance "h" from the center line to the left.

Figure 13:
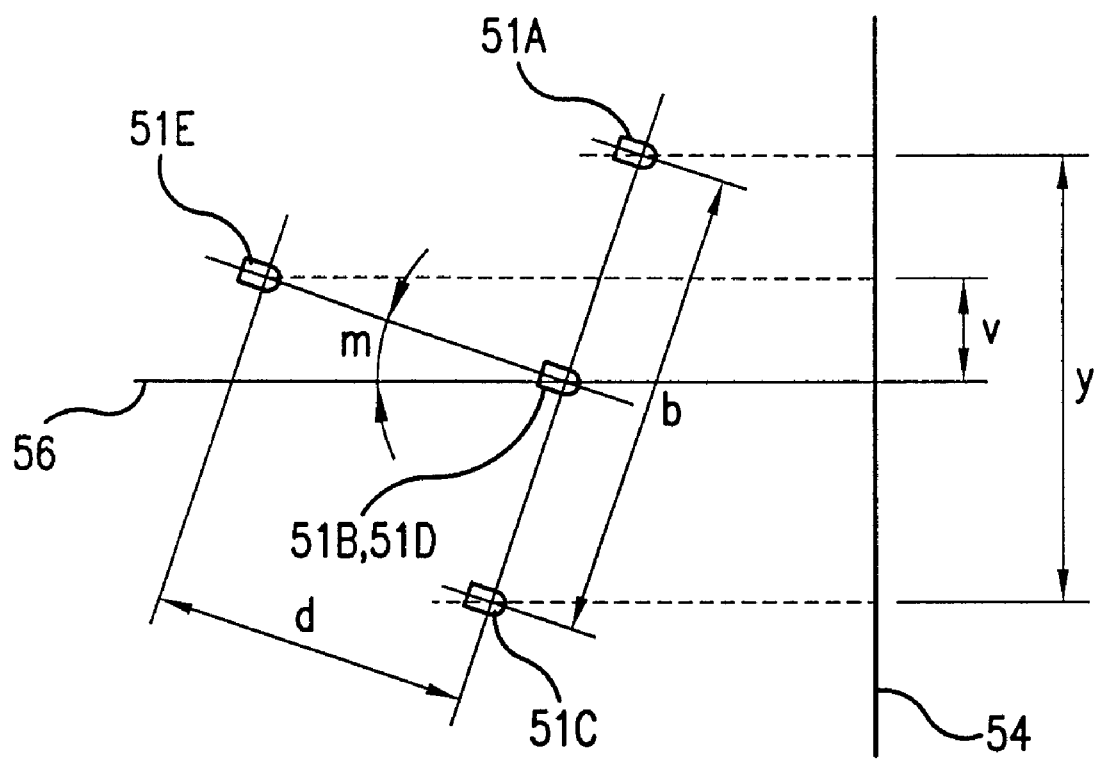
FIG. 13 is a side view showing positions of the LEDs of the designating tool of the first embodiment of the present invention.

FIG. 13 is a side view in which the LED 51 of the designating tool 1 is viewed from the side. The center line 56 connects a midpoint between the infrared LEDs 51A and 51C, and the lens 32. FIG. 13 shows a case when the designating tool 1 faces a downward diagonal direction at an angle "m" from the center line 56. When the projection plane 54 is assumed along lines extending perpendicularly from the center line 56, in the projection plane 54, the space between the infrared LEDs 51A and 51C becomes "y". Moreover, the infrared LED 51E is projected as being shifted upward by a distance "v" from the center line.

Figure 11:
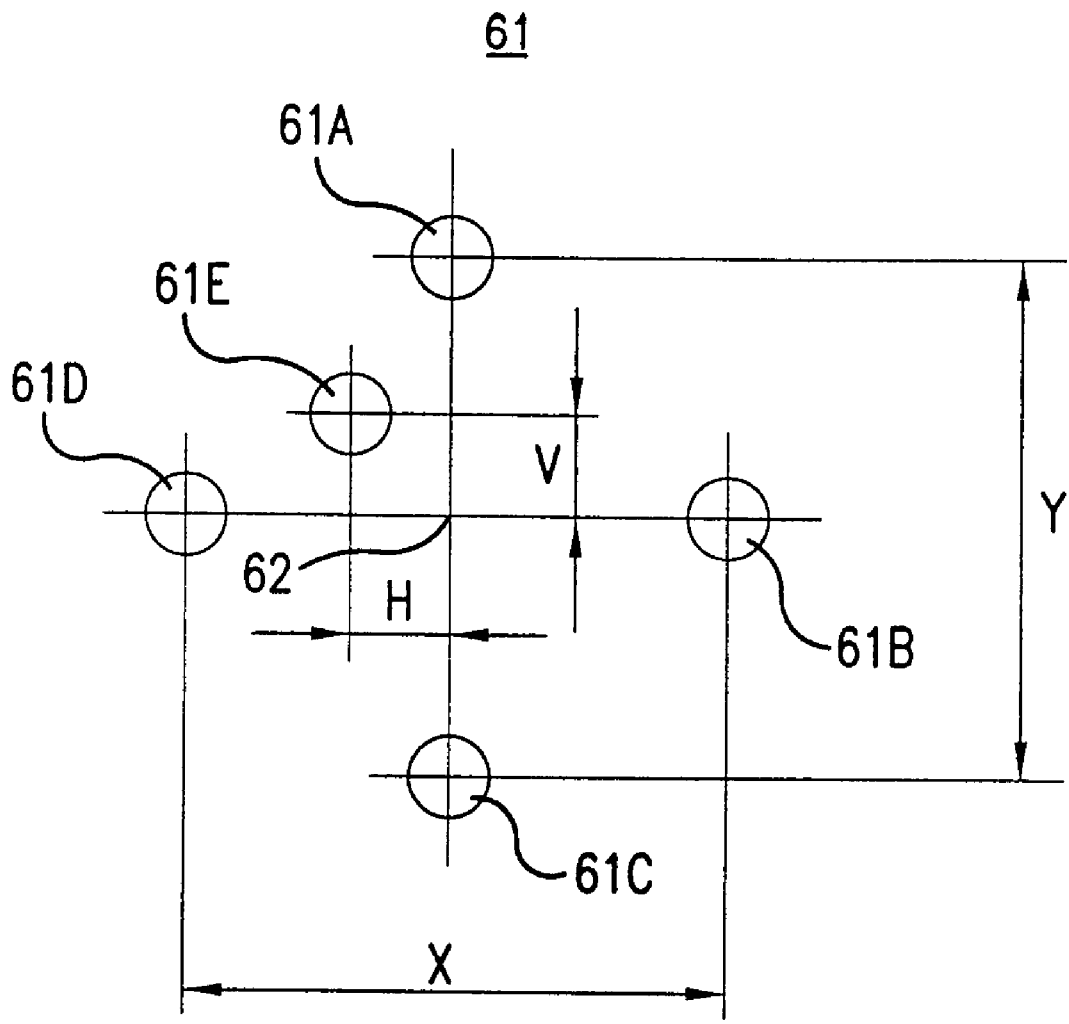
FIG. 11 is a diagram showing one example of the output image of the CCD camera of the first embodiment of the present invention.

Here, one example of the images 61 which are imaged by the CCD camera 31, is shown in FIG. 11. The image 61 can be considered as an image at an arbitrary magnification at the projection plane 54 of FIGS. 12 and 13. Therefore, the images 61 of FIG. 11 have the same geometrical relationships as the projected images in the projection plane 54. In FIG. 11, the images. 61A, 61B, 61C, 61D and 61E are the images transmitted by the infrared LEDs 51A, 51B, 51C, 51D and 51E, respectively. Moreover, the space between images 61B and 61D is "X", the space between 61A and 61C is "Y", the intersection of a straight line which connects the images 61B and 61D and a straight line which connects the images 61A and 61C is a reference point 62, the horizontal component of the distance between the reference point 62 and the image 61E is "H", and the vertical component is "V". The reference point 62 lies on an extension of the center line 56. Therefore, each value of x, h, y and v of FIGS. 12 and 13 becomes proportional to the respective value of X, H, Y and V of FIG. 11. Accordingly, when the relationships of the images 61A, 61b, 61C, 61D and 61E are checked, it is possible to find out how much the designating tool 1 is inclined horizontally and vertically with respect to the CCD camera 31.

Accordingly, even when the infrared LEDs 51A, 51B, 51C and 51D are disposed at the vertices of a rhombus, it can be treated similar to the case of when the aforementioned infrared LEDs 21A, 21B and 21C are disposed at the vertices of an isosceles triangle, and the coordinates on the screen can be used by using the same method.

Moreover, in the present embodiment, the case is described where the center infrared LED of the designating tool is positioned deeper inside the designating tool than the surrounding infrared LEDs. Furthermore, another example of this apparatus, wherein the center infrared LED protrudes outwardly with respect to the surrounding infrared LEDs, can be treated the same way by merely reversing the polarity of the output coordinates.

In the present embodiment, a method of independently obtaining angles in the horizontal and vertical planes is shown. However, when both planes are inclined, the angles which appear in the plan and side views are slightly shifted from the accurate values. Moreover, technically, error occurs when the designating tool is rotated. However, according to the present embodiment, the designating tool is operated while the operator watches the marker which is displayed on the screen. Thus, the result of the operation is instantly apparent, so that minor errors do not actually cause problems.

A second embodiment of the present invention is explained with reference to the drawings.

Figure 14:
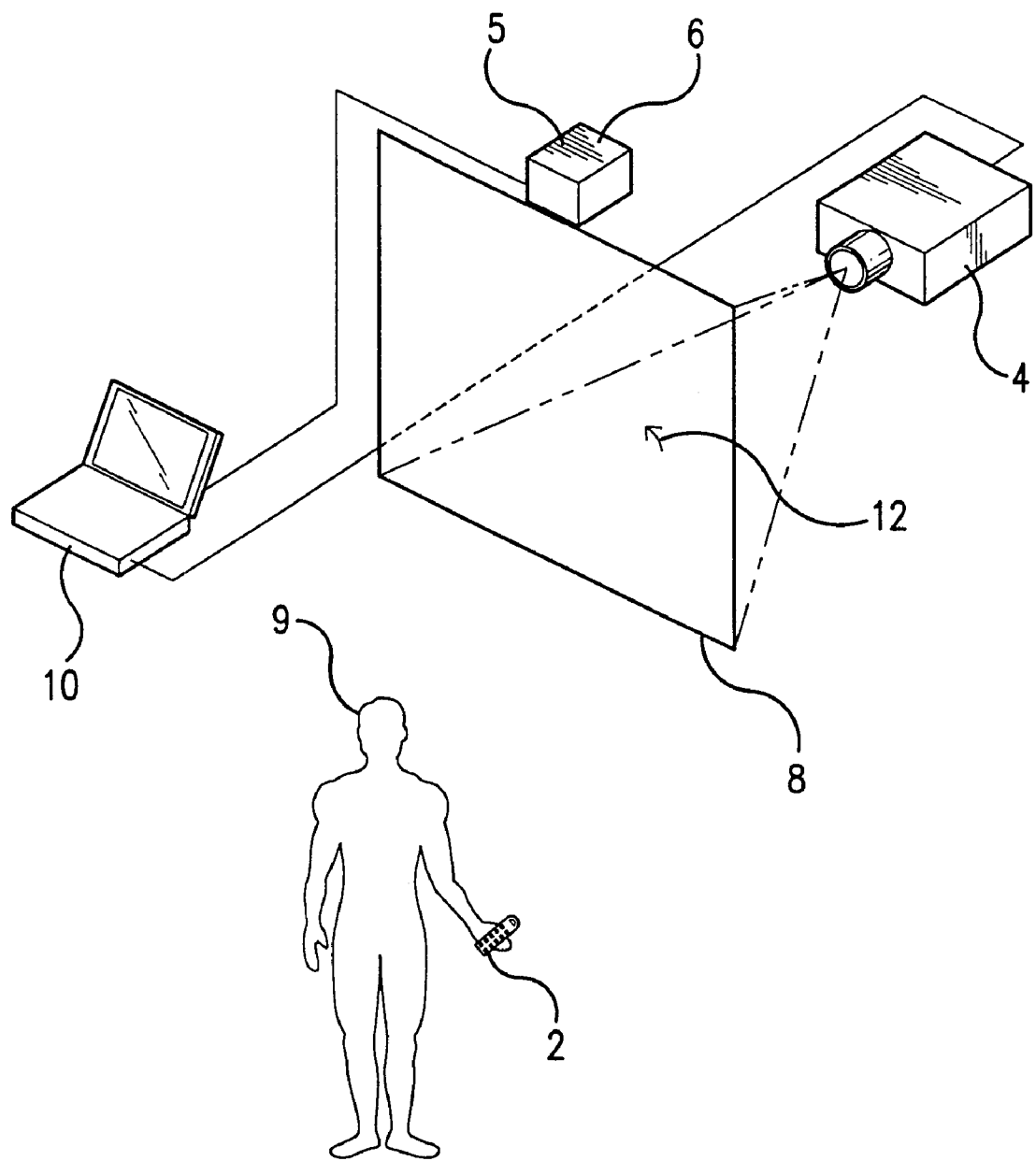
FIG. 14 is a diagram showing the second embodiment of the present invention.

FIG. 14 shows the second embodiment of the present invention. The display data of the computer 10 is sent to the projector 4, projected, enlarged and displayed on screen 8. The screen 8 is a rear type screen, wherein the side of the screen that is viewed is on the opposite side of the screen from the side that is projected onto by the projector 4.

At the top of the screen 8, an imaging part 5 and an illuminating part 6 are provided together in a single unit, which irradiates infrared light to a front surface of the designating tool 2 and images the reflected image, detects the orientation of the designating tool 2, converts the orientation into coordinates and transfers the coordinates to the computer 10.

During a presentation or the like, the position of the marker 12 can be shifted by the demonstrator 9 by changing the orientation of the designating tool 2 while watching the screen.

The marker 12 is the same as a pointer or cursor that is operated by a conventional mouse. The marker 12 can be shifted when the orientation of the designating tool 2 is changed, similar to a pointer and cursor being shifted when the mouse is shifted on a corresponding flat surface.

Figure 15:
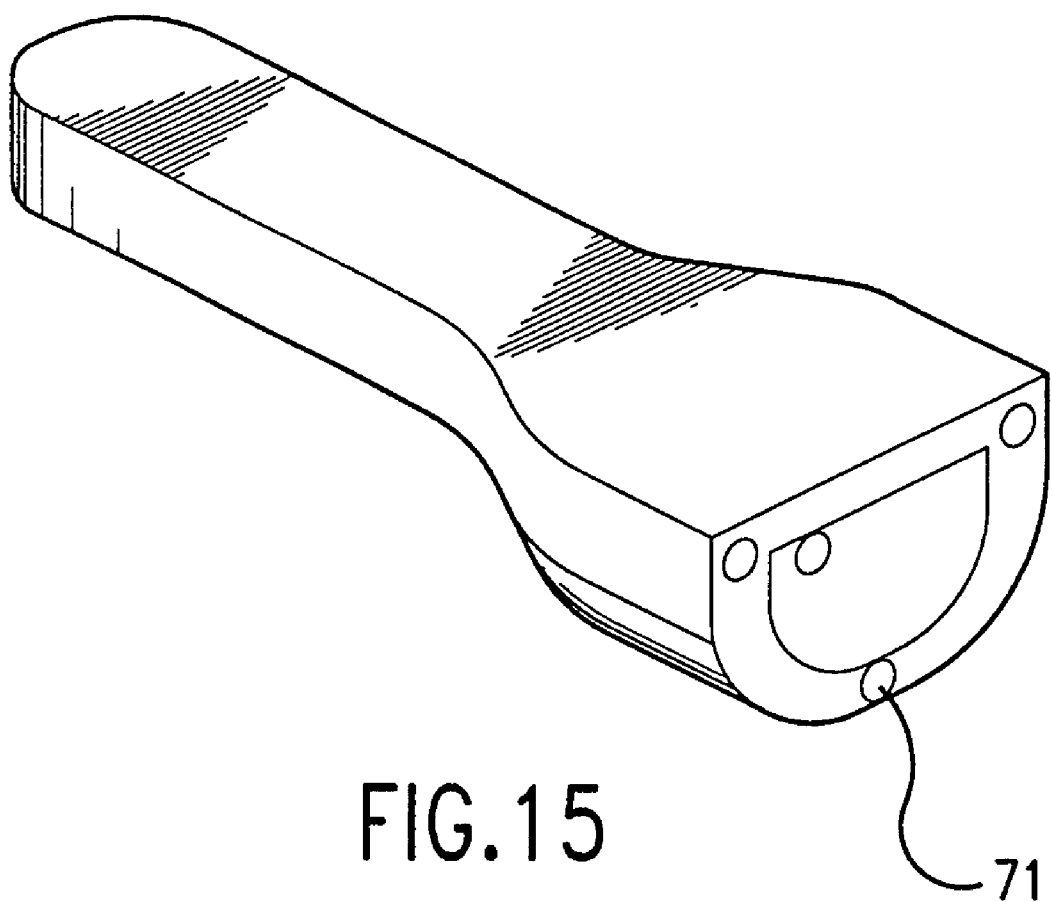
FIG. 15 is a diagram showing one example of a designating tool of the second embodiment of the present invention.

One example of the designating tool 2 is shown in FIG. 15. A plurality of reflecting members 71 that reflect infrared rays are provided on the front face of the designating tool 2.

Figure 16:
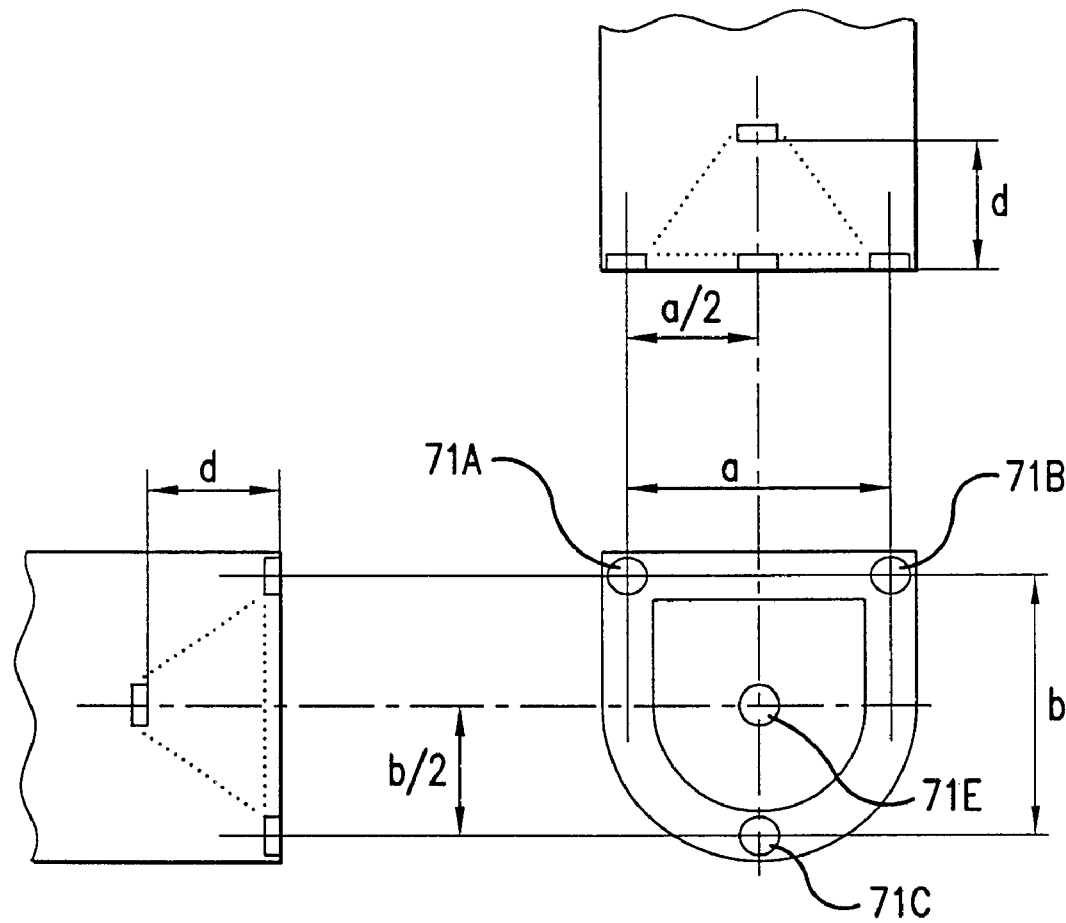
FIG. 16 is a three-face-view showing details of the front part of the designating tool of the second embodiment of the present invention.

FIG. 16 is a three-face-view which shows details of the front face portion of the designating tool 2. The reflecting members 71A, 71B and 71C, which are the first reflecting elements, are disposed in the same plane at the vertices of an isosceles triangle. The reflecting members 71A and 71B are separated by a distance "a". A line that connects materials 71A and 71B is parallel to the top surface of the designating tool 2. The reflecting member 71C is separated by a distance "b" in the vertical direction from the center of a line which connects reflecting materials 71A and 71B. The reflecting member 71E, which is the second reflecting element, is disposed at a position which is recessed by a distance "d" within the designating tool, separated by a distance b/2 in the vertical direction from 71C in the front view.

Figure 17:
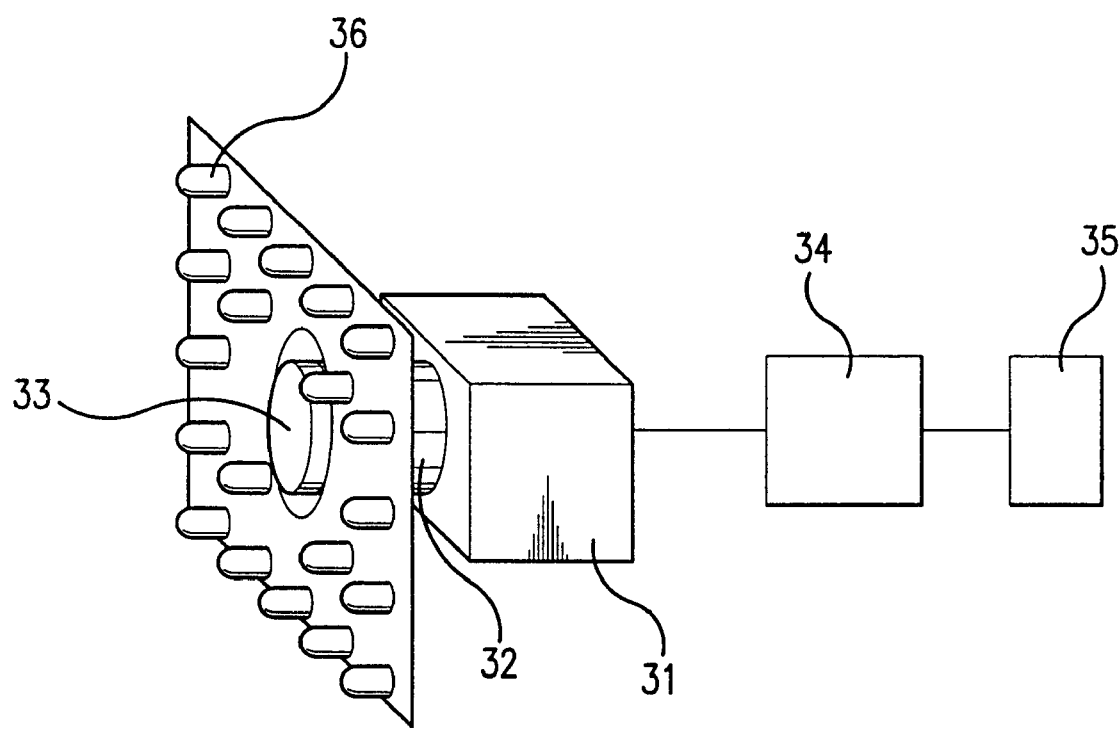
FIG. 17 is diagram showing one example of an irradiating part and an imaging part of the second embodiment of the present invention.

One example of the imaging part 5 and the illuminating part 6 is shown in FIG. 17. The illuminating part 6 has a structure in which many infrared LEDs 36 are disposed around the lens 32 of the CCD camera 31, and irradiates in the direction which is imaged by the imaging part 5. Moreover, the imaging part 5 includes the CCD camera 31, the lens 32, the infrared ray filter 33, the image processor 34, and the output part 35. The lens 32 and the infrared ray filter 33 are disposed on the CCD camera 31, and an image of the reflecting member 71 of the designating tool 2 is imaged. The output of the CCD camera 31 is connected to the image processor 34. The image processor 34 calculates the planar coordinates on the screen 8 based on the image of the reflecting member 71 of the designating tool 2 which has been imaged by the CCD camera 31, and sends it to the computer 10 via the output part 35.

One example of the output image of the CCD camera 31 is shown in FIG. 5. Since the infrared ray filter 33 is disposed in front of the lens 32, the light of interior room illuminations or the like are substantially eliminated, as shown in FIG. 5, and only images 41 transmitted by the reflecting member 71 are output.

Here, the transmitting of the images 41 by the designating tool 2 is explained with reference to the figures.

Figure 18:
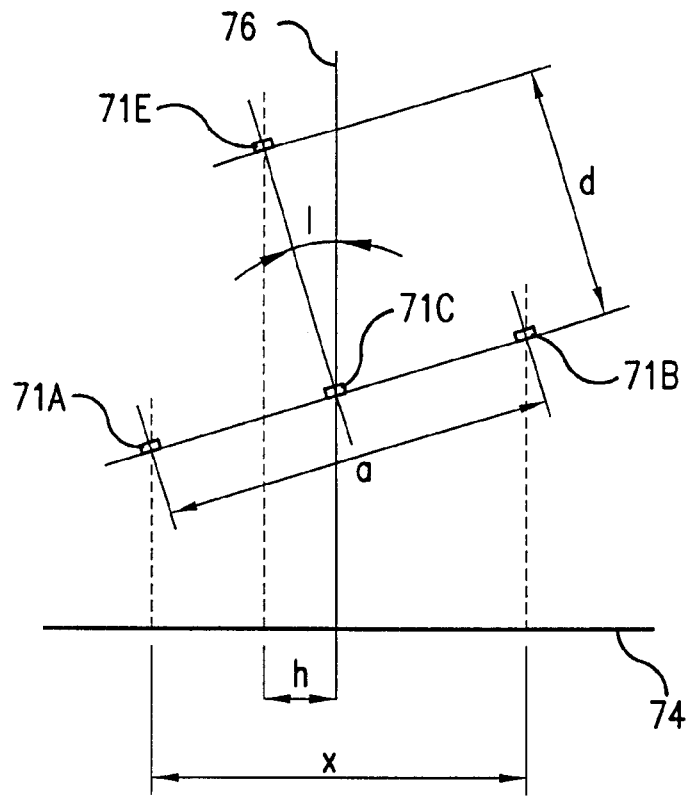
FIG. 18 is a plan view showing the position of the reflecting members of the designating tool of the second embodiment of the present invention.

FIG. 18 is a plan view in which the reflecting member 71 of the designating tool 2 is viewed from the top. The center line 76 connects a midpoint between the reflecting members 71A and 71B and the lens 32. FIG. 18 shows the case when the designating tool 2 faces a left diagonal direction at an angle l from the center line 76. When the projection plane 74 is assumed on lines extending perpendicularly from the center line 76, in the projection plane 74, the space between the reflecting member 71A and 71B becomes "x", and the reflecting member 71E is shifted to the left by a distance "h" from the center line and is projected.

Figure 19:
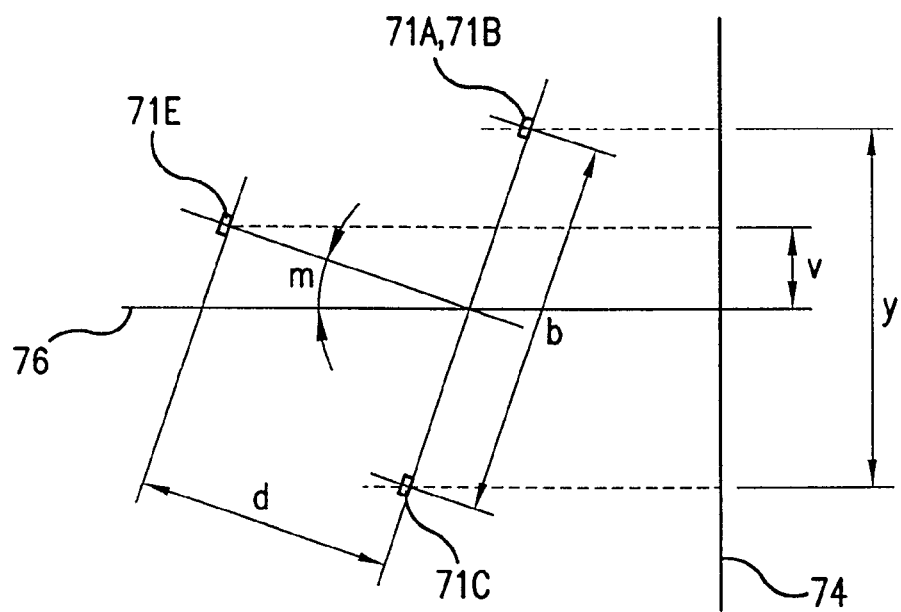
FIG. 19 is a side view showing the position of the reflecting members of the designating tool of the second embodiment of the present invention.

FIG. 19 is a side view in which the reflecting member 71 of the designating tool 2 is viewed from the side. The center line 76 connects the midpoint between the reflecting members 71A, 71B and 71C and the lens 32. FIG. 19 shows a case when the designating tool 2 faces the downward diagonal direction at an angle m from the center line 76. When the projection plane 74 is assumed on lines extending perpendicularly from the center line 76, in projection plane 74, the distance between the reflecting member 71A, 71B and 71C becomes "y", and the reflecting member 71E is shifted upwards by a distance "v" from the center line and is projected.

Here, the images 41 which have been imaged by the CCD camera 31 can be considered as images which are imaged at an arbitrary magnification at projection plane 74 of FIGS. 18 and 19. Thus, the images 41 of FIG. 5 have the same geometrical relationship as the projected images in the projection plane 74. In FIG. 5, the images 41A, 41B, 41C, and 41E are the images of the reflecting members 71A, 71B, 71C, and 71E, respectively. Furthermore, the distance between the image 41A and 41B is defined as "X", the distance between the center of the line connecting 41A with 41B and the image 41C in a vertical direction is defined as "Y", and the position which is above the image 41C by Y/2 is defined as a reference point 42. The horizontal component of the distance between the reference point 42 and the image 41E is defined as "H", and the vertical component of the distance between the image 41E and the reference point 42 is defined as "V". Because the reference point 42 lies on an extension of the center line 76, each value of x, h, y and v of FIGS. 18 and 19 has a proportional relationship to the respective value of X, H, Y or V of FIG. 5. Therefore, if the relationships of the images 41A, 41B, 41C, and 41E to the images 41 are checked, it is possible to determine how much designating tool 2 is inclined in the horizontal and vertical directions with respect to the CCD camera 31.

$$x = a\cos l \quad \text{[Equation 5]}$$

$$h = d\sin l$$

$$\therefore \frac{h}{x} = \frac{d}{a}\tan l$$

$$\therefore l = \tan^{-1}\left(\frac{a}{d}\frac{h}{x}\right)$$

$$y = b\cos m \quad \text{[Equation 6]}$$

$$v = d\sin m$$

$$\therefore \frac{v}{y} = \frac{d}{b}\tan m$$

$$\therefore m = \tan^{-1}\left(\frac{b}{d}\frac{v}{y}\right)$$

Equation 5 is a formula showing the relationship in the horizontal direction in the projection plane 74. Furthermore, Equation 6 is a formula showing the relationship in the vertical direction in the projection plane 74. As described earlier, each value of x, h, y, and v has a proportional relationship with the respective value of X, H, Y, or V, so Equations 5 and 6 can be defined as Equation 7, which will be shown as follows.

$$l = \tan^{-1}\left(\frac{a}{d}\frac{H}{X}\right) \quad \text{[Equation 7]}$$

$$m = \tan^{-1}\left(\frac{b}{d}\frac{V}{Y}\right)$$

Here, because the values of a, b, and d of the designating tool 1 are already-known values, angles l and m can be obtained from the images 41 of FIG. 5.

Furthermore, the data which is output to the computer 10 from the output part 35 provide horizontally and vertically orthogonal coordinates of the plane which is projected onto the screen 8. Therefore, if the center of the screen is the point of origin, as shown in Equation 8, the angles l and m can be converted to the coordinates Xs, Ys.

$$Xs = K\tan l \quad \text{[Equation 8]}$$

$$= K\frac{a}{d}\frac{H}{X}$$

$$Ys = K\tan m$$

$$= K\frac{b}{d}\frac{V}{Y}$$

Here, K of Equation 8 is a proportional constant and is a value to determine sensitivity of output and the inclination of the designating tool 1. This value can be fixed at an appropriate value which can be easily used, or can be set in response to the preference of the demonstrator 9. Furthermore, as understood from Equation 8, the values of angles l and m do not need to be obtained in the actual calculation.

Next, according to the above image processor 34, a method of obtaining the coordinates on the screen which are transmitted by the designating tool 1 to form the images 41 which are imaged by the CCD camera 31 is explained by the flow chart of FIG. 8.

In S1, the center of balance coordinates of each of the images 41A, 41B, 41C, and 41E are obtained in order to determine a substantially center position as a representative point, because the images have a limited size. The center position can be obtained by a commonly known calculation method.

In S2, the distance X in the horizontal direction and an intermediate coordinate between the images 41A and 41B are obtained from the center of balance coordinates of the images 41A and 41B.

In S3, the distance Y in the vertical direction and the coordinates of the reference point 42, which is the midpoint of both the distance X and the distance Y, are obtained from the center of balance coordinates of the image 41C and the intermediate coordinate which was obtained in S2.

In S4, the center position of image 41E and the horizontal distance H and the vertical distance V of the reference point 42 are obtained.

In S5, the coordinates Xs, Ys on the screen 8 are obtained by Equation 8.

In summary, a method of obtaining the above coordinates, the distances X, Y and the reference point 42, are obtained from the images 41A, 41B, and 41C of the reflecting members 71A, 71B, and 71C, which are the first reflecting elements of the designating tool 2, the horizontal and vertical distances H, V of the reference point 42 are obtained from the image 41E of the reflecting member 71E, which is the second reflecting element, and the coordinates Xs, Ys on a screen are obtained by the above calculation.

Furthermore, the coordinates on the screen 8 use the center as the point of origin. However, it is possible to use a peripheral part of the screen as the point of origin by setting a bias value.

The case where only one designating tool 2 is used is explained above. However a method of obtaining the coordinates on the screen designated by respective designating tools when a plurality of designating tools are simultaneously used is explained by the flowchart of FIG. 27.

In S1, the image is enlarged and processed for each image. It is preferable to perform a processing to fill in the periphery of the part in which the image exists by the same signal at a predetermined size.

Next, in S2, the image area is obtained for each designating tool by performing segmentation.

Since an image area is thus obtained for each designating tool, the coordinates may be obtained by the flow chart explained in FIG. 8 for the respective image ranges.

The above invention is explained based upon the embodiment of the designating tool 2 shown in FIG. 19. However, as another example of the invention, it is also possible to perform the same processing as is done with LEDs by replacing the LEDs 51A, 51B, 51C, 51D, and 51E explained in embodiment 1 with reflecting members.

Thus, even when the reflecting members are disposed at the vertices of a rhombus, it is possible to operate in the same manner as the case in which the reflecting members 71A, 71B, and 71C are disposed in the shape of an isosceles triangle. Thus, it is possible to obtain the coordinates on the screen by the same method.

Furthermore, in the present embodiment, the case is explained in which the center reflecting member of the designating tool 2 is disposed behind the surrounding reflecting members. However, as another example of the invention, when the center reflecting member protrudes outwardly with respect to the surrounding reflecting members, it is possible to operate in the same manner by merely reversing the polarity of the output coordinates.

Furthermore, the method of independently obtaining angles in the horizontal and vertical planes is shown in the present embodiment. However, when both the horizontal and vertical planes are inclined, the angles which will be shown in the plan and side views are technically different from accurate values. Furthermore, errors also technically occur when the designating tool is rotated. However, in the case of the present embodiment, when the designating tool is operated while watching the marker which is displayed on the screen, the result of the operation is instantly apparent, so that these errors do not cause a problem.

In addition, a structure in which the imaging part 5 and the illuminating part 6 are integrated is explained in the present embodiment. However, it is also possible to install them in separate locations.

The third embodiment of the present invention is explained based upon the figures.

Figure 20:
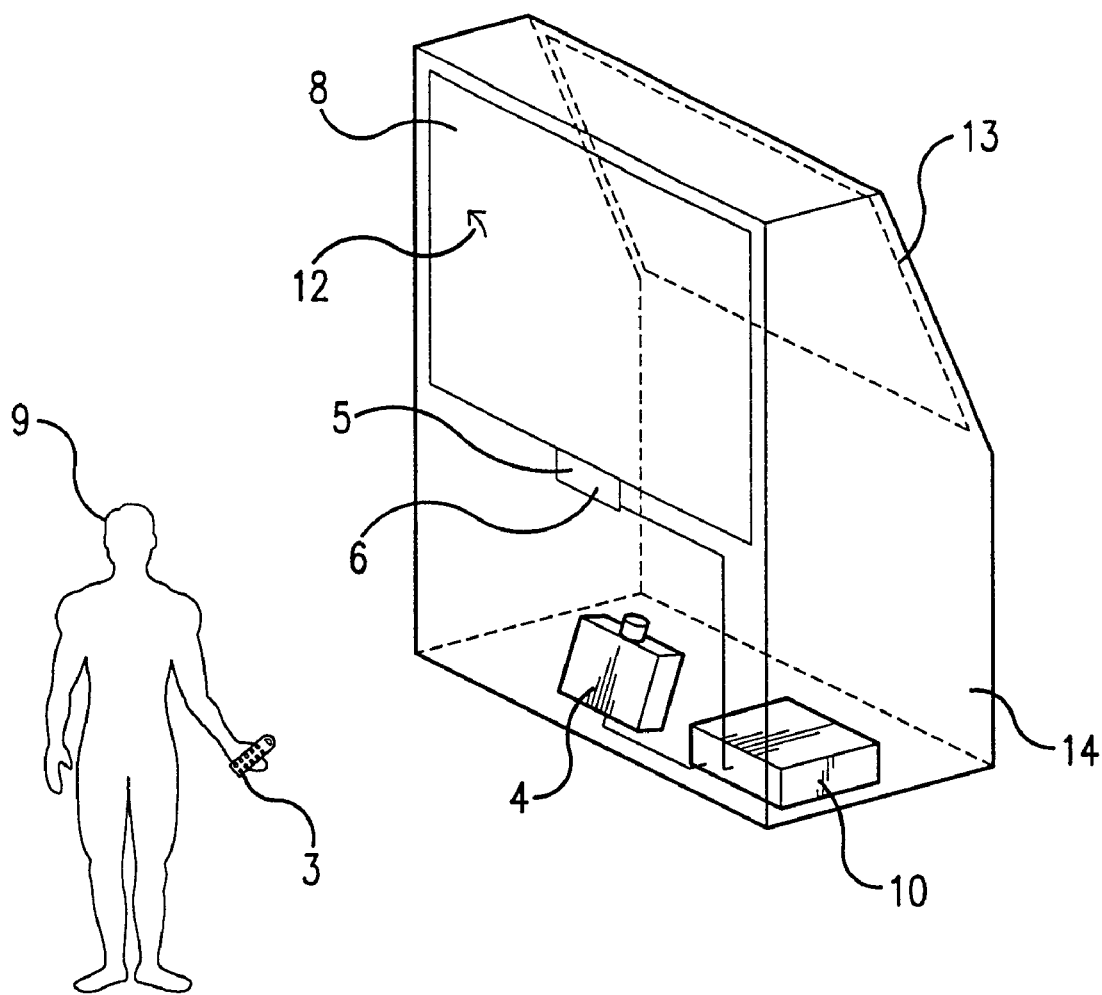
FIG. 20 is a diagram showing a third embodiment of the present invention.

FIG. 20 shows the third embodiment of the present invention. The display data of a computer 10 is sent to a projector 4, and the projected image is reflected against a mirror 13, is enlarged, and is displayed on a screen 8. The screen 8 is a rear type screen, wherein the surface that is observed is on the opposite side as the surface that is projected onto by the projector 4. Additionally, the projector 4, the mirror 13, and the computer 10 are stored in a case 14, and these elements, collectively, except the computer 10, can be referred to as a rear projector.

The imaging part 5 and an illuminating part 6 are integrated and disposed at the bottom of the screen 8. The reflected image is imaged as infrared light, and is irradiated in front. The direction of the designating tool 3 is detected, converted into coordinates, and is transmitted to the computer 10.

During a presentation or the like, the demonstrator 9 can move the position of the marker 12 by changing the orientation of the designating tool 3 while watching the screen.

The marker 12 is the same as the pointer or cursor which is operated by a conventional mouse. It is possible to move the marker 12 by changing the orientation of the designating tool 3 in the same manner that the pointer or cursor is moved by moving the mouse on a corresponding flat surface.

Figure 21:
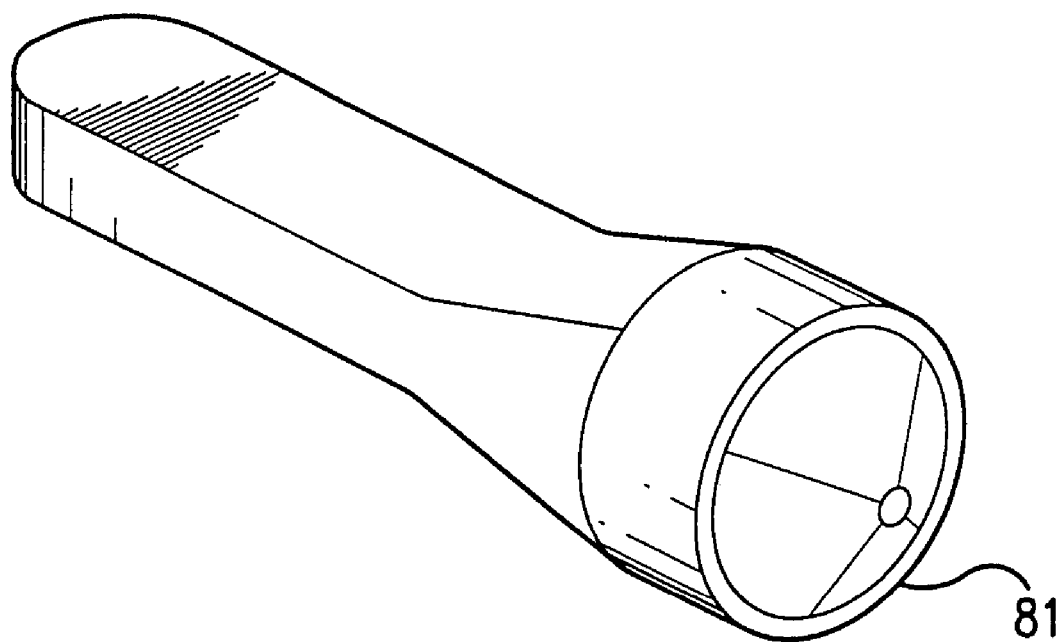
FIG. 21 is a diagram showing one example of a designating tool of the third embodiment of the present invention.

One example of the designating tool 3 is shown in FIG. 21. A plurality of reflecting members 81 which reflect infrared radiation, are disposed on the front face of the designating tool.

Figure 22:
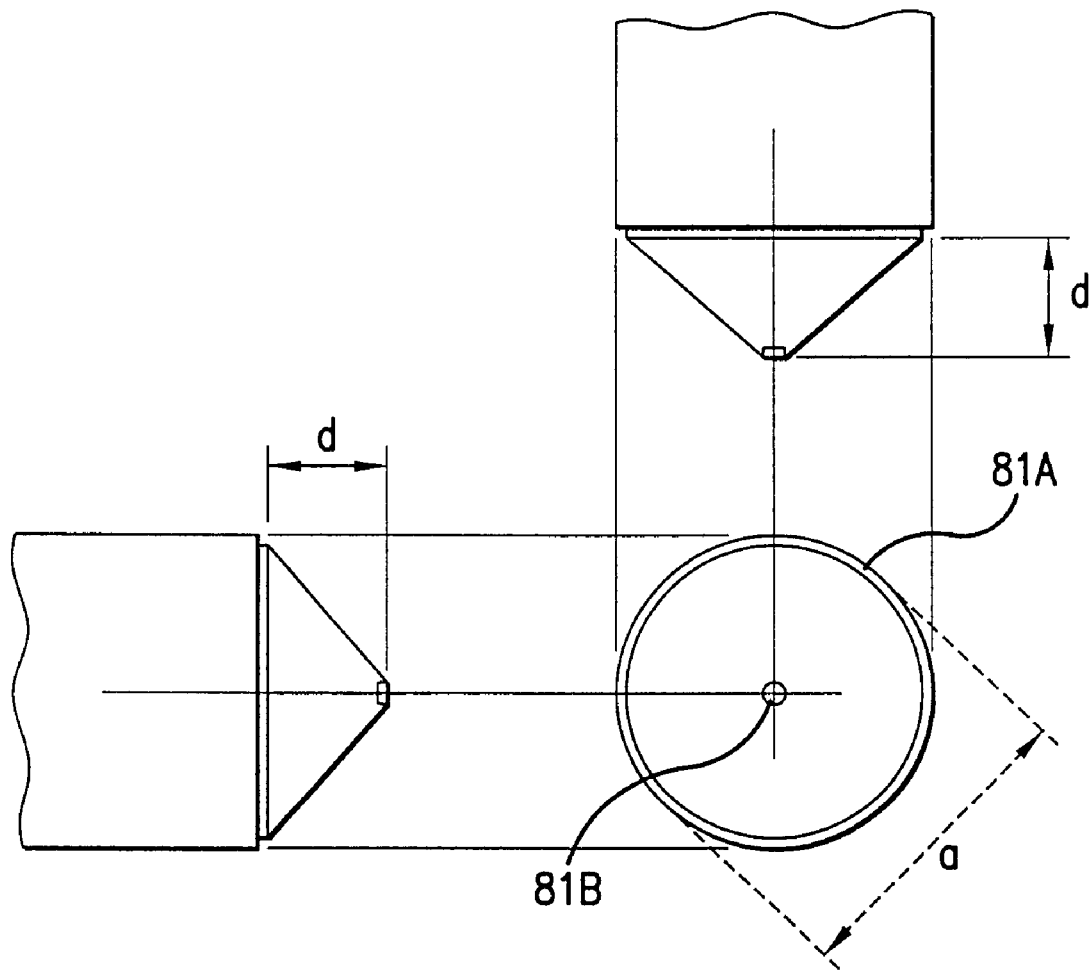
FIG. 22 is a three-face-view showing details of the front part of the designating tool of the third embodiment of the present invention.

FIG. 22 is a three-face-view showing the front face of the designating tool 3 in detail. The reflecting members 81 comprise a reflecting member 81A, which is the first reflecting element, and a reflecting member 81B, which is the second reflecting element. The reflecting member 81A is in the shape of a ring, wherein the center diameter is a distance "a", and the reflecting member 81B is disposed in the center, protruding outward by a distance "d".

One example of the imaging part 5 and the illuminating part 6 is shown in FIG. 17. The illuminating part 6 has a structure in which many infrared LEDs 36 are disposed at the periphery of the lens 32 of the CCD camera 31, and irradiate in the direction which is imaged by the imaging part 5. Additionally, the imaging part 5 includes the CCD camera 31, the lens 32, the infrared ray filter 33, the image processor 34, and the output part 35. The lens 32 and the infrared ray filter 33 are attached to the CCD camera 31, and the image of the reflecting members 81 of the designating tool 3 is imaged. The output of the CCD camera 31 is connected to the image processor 34. The image processor 34 calculates the planar coordinates on the screen 8, based upon the image of the reflecting members 81 of the designating tool 3 which have been imaged by the CCD camera 31, and outputs them to the computer 10 via the output part 35.

Figure 23:
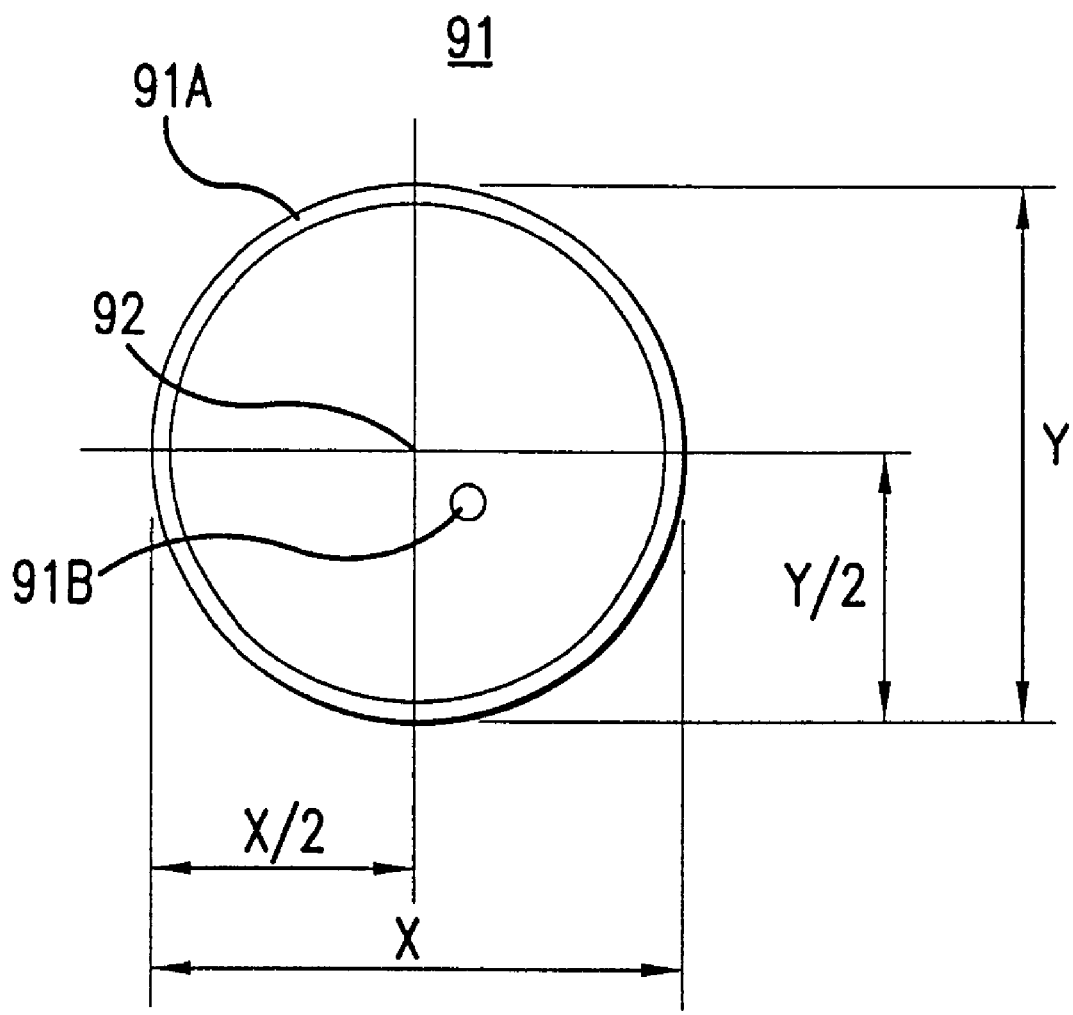
FIG. 23 is a diagram showing one example of an output image of a CCD camera of the third embodiment of the present invention.

One example of an output image of the CCD camera 31 is shown in FIG. 23. Because the infrared ray filter 33 is fixed in front of the lens 32 of the CCD camera 31, light such as room illumination can be substantially eliminated, and only the image 91 of the reflecting members 81 is output, as shown in FIG. 23.

Here, the transmitting of the images 91 by the designating tool 3 is explained by the diagrams.

Figure 24:
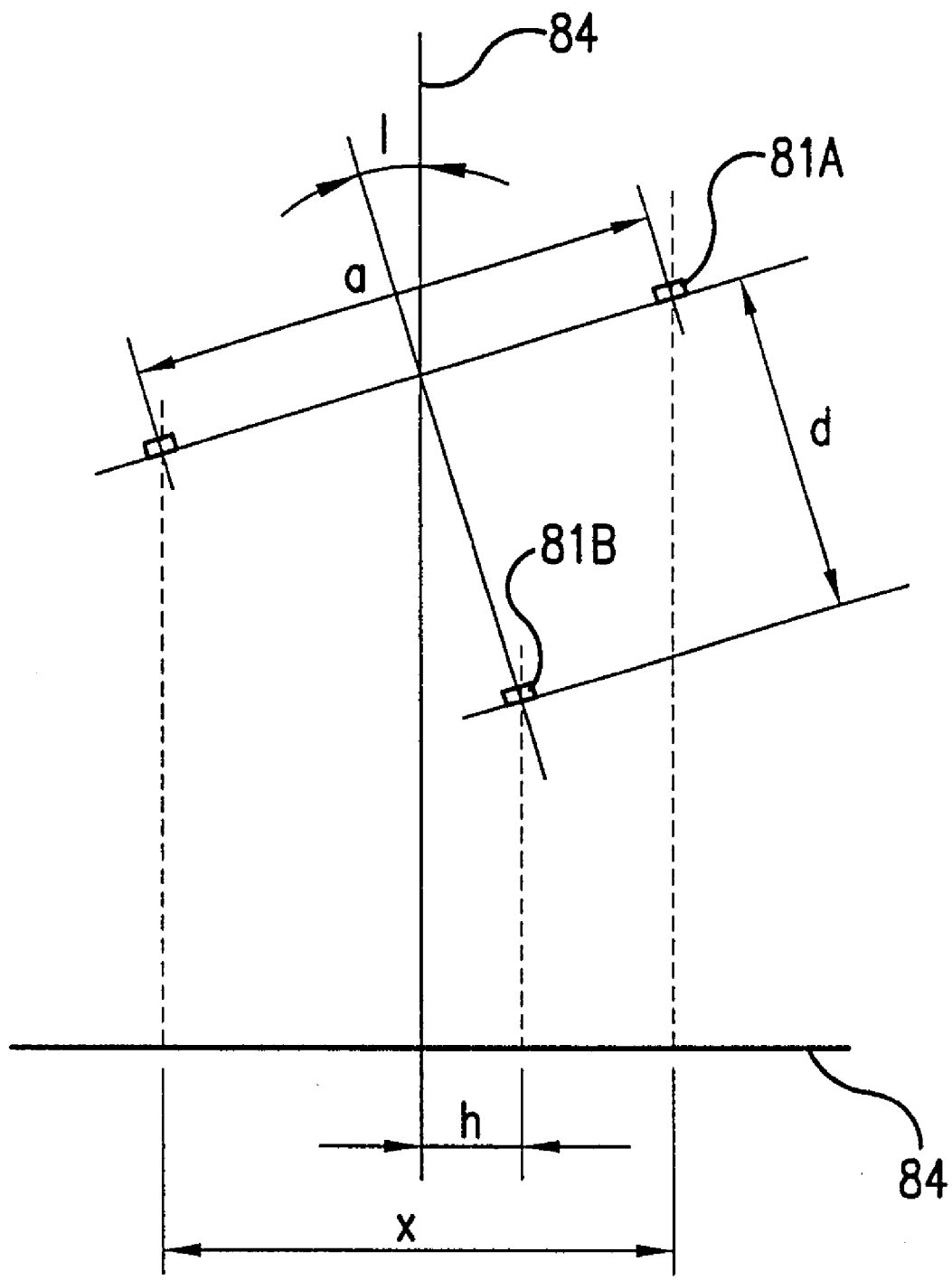
FIG. 24 is a plan view showing the position of the reflecting members of the designating tool of the third embodiment of the present invention.

FIG. 24 is a plan view of the reflecting members 81, as seen from the top by cutting the designating tool 3 in a horizontal plane through its center. The center line 86 is a line connecting the center of the reflecting member 81A with the lens 32. FIG. 24 shows the case when the designating tool 3 is inclined from the center line 86 at an angle l in the left diagonal direction. If the projection plane 84 is assumed along lines extending perpendicularly from the center line 86, the interval of the reflecting member 81A in the projection plane 84 in the diameter direction is "x", and the reflecting member 81B is shifted to the left from the center line by a distance "h" and is projected.

Figure 25:
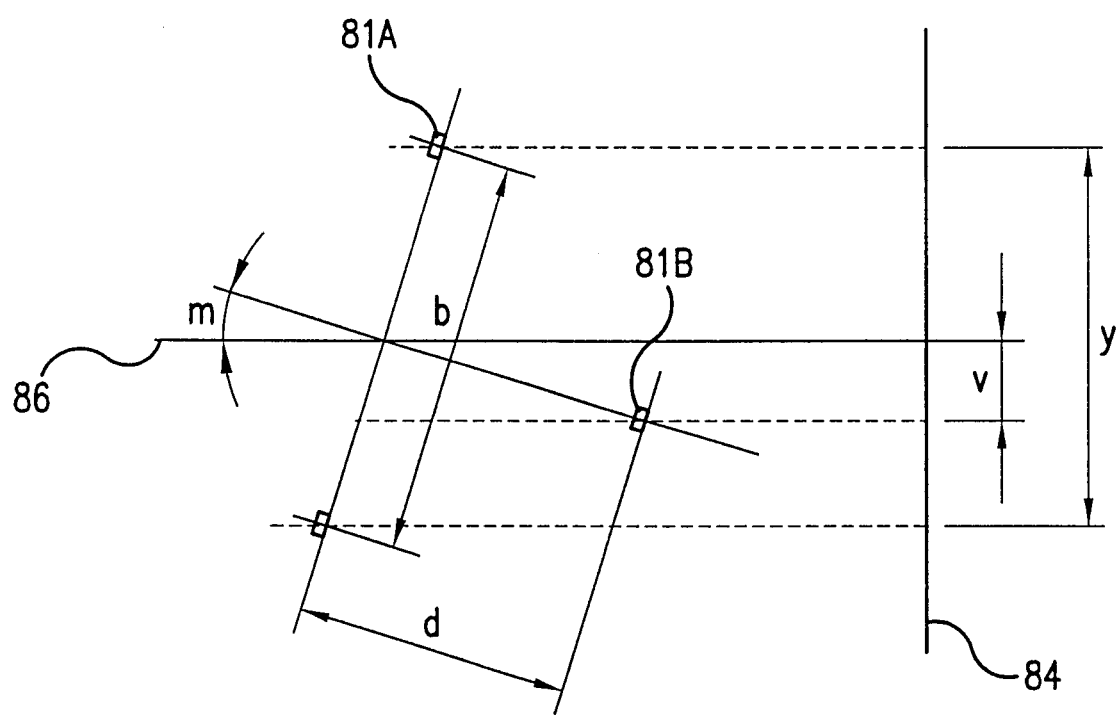
FIG. 25 is a side view showing the position of the reflecting members of the designating tool of the third embodiment of the present invention.

FIG. 25 is a side view of the reflecting members 81 by cutting the designating tool 3 along a vertical plane through its center. The center line 86 is a line connecting the center of the reflecting member 81A with the lens 32. FIG. 25 shows the case when the designating tool 3 faces a downward diagonal direction from the center line 86 at an angle m. If the projection plane 84 is assumed along lines extending perpendicularly from the center line 86, the interval of the reflecting member 81A in the diameter direction is "y" in the projection plane 84, and the reflecting member 81B is shifted in an upper direction by a distance "v" from the center line and is projected.

Here, the images 91 which are imaged by the CCD camera 31 can be considered as images which are imaged at an arbitrary magnification at the projection plane 84 of FIGS. 24 and 25. So the images 91 of FIG. 23 have the same geometrical relationship as the projected images in the projection plane 84. In FIG. 23, the images 91A and 91B are images of the reflecting members 81A and 81B, respectively. Furthermore, the maximum interval of the image 91A in the horizontal direction is defined as "X", the maximum interval in the vertical direction is defined as "Y", and the crossing point of vertical and horizontal lines which travel through the center of the respective intervals is defined as the reference point 92. Furthermore, the horizontal component of the distance between the reference point 92 and the image 91B is defined as "H", and the vertical component is defined as "V". Because the reference point 92 lies on an extension of the center line 86, each value of x, h, y, and v of FIGS. 24 and 25 has a substantially proportional relationship to the respective value of X, H, Y, or V of FIG. 23. Accordingly, if the relationships of images 91A and 91B of the images 91 are checked, it is possible to determine how much the designating tool is inclined in the horizontal and vertical directions with respect to the CCD camera 31.

$$x = a\cos l \quad \text{[Equation 9]}$$

$$h = d\sin l$$

$$\therefore \frac{h}{x} = \frac{d}{a}\tan l$$

$$\therefore l = \tan^{-1}\left(\frac{a}{d}\frac{h}{x}\right)$$

$$y = a\cos m \quad \text{[Equation 10]}$$

$$v = d\sin m$$

$$\therefore \frac{v}{y} = \frac{d}{a}\tan m$$

$$\therefore m = \tan^{-1}\left(\frac{a}{d}\frac{v}{y}\right)$$

Equation 9 is a formula showing the relationship in the horizontal direction of the projection plane 84. Furthermore, Equation 10 is a formula showing the relationship in the vertical direction of the projection plane 84. As described earlier, each value of x, h, y, and v has a substantially proportional relationship to the respective value of X, H, Y, or V of FIG. 23, so Equations 9 and 10 can be defined as Equation 11 which will be shown below.

$$l = \tan^{-1}\left(\frac{a}{d}\frac{H}{X}\right) \quad \text{[Equation 11]}$$

$$m = \tan^{-1}\left(\frac{a}{d}\frac{V}{Y}\right)$$

Here, the values of a, d are already-known values of the designating tool 3, so the angles l and m can be obtained from the images 91 of FIG. 23.

Furthermore, the data which is output to the computer 10 from the output part 35 provides horizontally and vertically orthogonal coordinates of the plane which is projected onto the screen 8. Therefore, if the center of the screen is the point of origin, it is possible to convert the angles l and m to the coordinates Xs, Ys, as shown in Equation 12.

$$Xs = K\tan l \quad \text{[Equation 12]}$$

$$= K\frac{a}{d}\frac{H}{X}$$

$$Ys = K\tan m$$

$$= K\frac{a}{d}\frac{V}{Y}$$

Here, K of Equation 12 is a proportional constant and is a value to determine the sensitivity of output and the inclination of the designating tool 3. This value can be fixed at an appropriate value which can be easily used, or can be set in response to the preference of the demonstrator 9. Furthermore, as understood from Equation 12, the values of angles l, m do not need to be obtained in the actual calculation.

Figure 26:
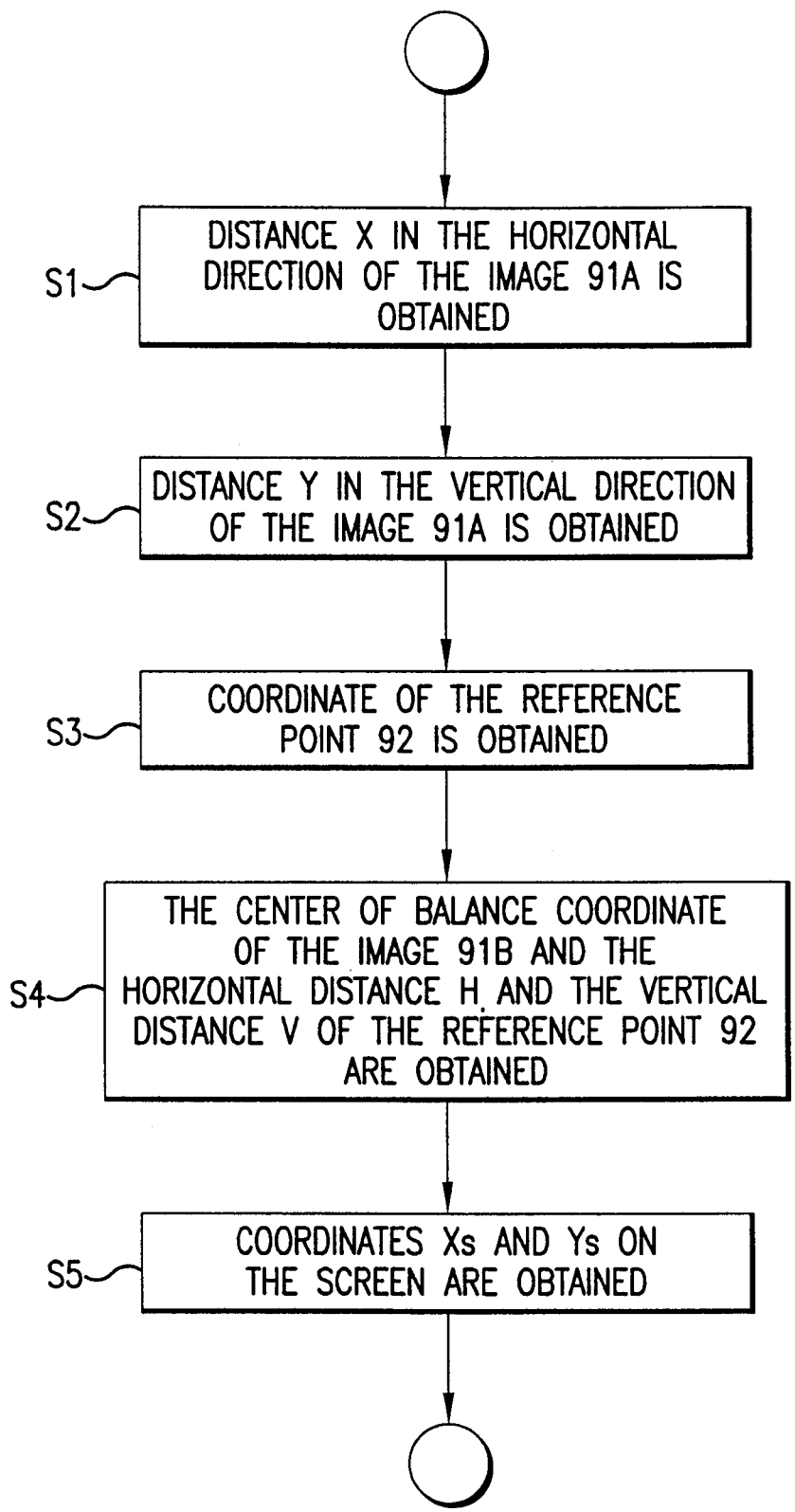
FIG. 26 is a flow chart showing a procedure of obtaining coordinates of the third embodiment of the present invention.

Next, in accordance with the image processor 34, a method of obtaining coordinates on the screen which are designated by the designating tool 3 from the images 91 which have been imaged by the CCD camera 31 is explained by the flowchart of FIG. 26.

In S1, the positions of the right and left edges of the image 91A in the horizontal direction are obtained, the center of balance coordinates in the horizontal direction of each edge part are obtained, and the distance X between both edge parts in the horizontal direction is obtained.

In S2, the positions of the upper and lower edges of the image 91A in the vertical direction are obtained, the center of balance coordinates in the vertical direction of each edge part are obtained, and the distance Y between both edge parts in the vertical direction is obtained.

In S3, the coordinates of the reference point 92, which is at the center position of both X and Y, respectively, are obtained.

In S4, the center of balance coordinate of the image 91B is obtained, and the distance between the image 91B and the coordinates of the reference point 92 is obtained as H in the horizontal direction and as V in the vertical direction.

In S5, the coordinates Xs, Ys on the screen are obtained by Equation 12.

In summary, in accordance with the method of obtaining the above coordinates, the distances X, Y and the reference point are obtained from the image 91A of the reflecting member 81A, which is the first reflecting element of the designating tool 3, the horizontal and vertical distances H, V between the reference point and the image 91B of the reflecting member 91B, which is the second reflecting element, are obtained, and the coordinates Xs, Ys on the screen are obtained by a calculation.

Furthermore, the coordinates on the screen use the center as the point of origin, but it is possible to use the periphery of the screen as the point of origin by setting a bias value.

The case in which only one designating tool 3 is used has been explained above. However, a method for obtaining the coordinates on the screen designated by respective designating tools when a plurality of designating tools are simultaneously used is explained by the flowchart of FIG. 27.

In S1, the image is enlarged and processed for each image. It is preferable to fill in the periphery of the part in which the image exists by the same signal at a predetermined size.

Next, in S2, the image area is obtained for each designating tool by performing segmentation.

Because the image area is thus obtained for the designating tool, the coordinates can be obtained by the flow chart explained in FIG. 26 with regard to the respective image areas.

As explained above, in the present embodiment, the case in which the reflecting member at the center of the designating tool 3 protrudes outwardly with respect to the reflecting member at the periphery is explained. However, as another example of the invention, when the reflecting member at the center is positioned behind the reflecting member at the periphery, it is possible to operate in the same manner by merely reversing the polarity of the output coordinates.

Furthermore, a method for obtaining angles independently in the horizontal and vertical planes is shown in the present embodiment, and when both planes are inclined, the angle which appears in the plan and side views is technically not accurate. However, as in the present embodiment, when the demonstrator operates the designating tool while watching the marker which is displayed on the screen, the operation result is instantly apparent, so that minor errors do not cause a problem.

As explained above, according to the present invention, the designating tool includes at least three light emitting elements and a light emitting element which is located on an orthogonal axis to a plane delineated by the at least three light emitting elements, the relative positional relationship of the light emitting elements is imaged by an image pick-up means, and the orientation in which the designating tool points toward the image pick-up means is obtained from the image signal and is converted to planar coordinates. Therefore, it is possible to use application software of the computer by moving the marker on the screen as the demonstrator moves the designating tool. Because of this, it is possible for the demonstrator to explain items by pointing them out, as if with a laser pointer, without having to move from in front of the screen during a presentation where a computer screen is enlarged and projected by a projector. Therefore, it is possible to prevent the audience from being distracted.

Furthermore, light emitting elements are disposed at each vertex of an isosceles triangle, and the base of the triangle connecting two of the light emitting elements is substantially horizontally disposed, so square and/or root calculations are not needed in order to obtain the diagonal distance and coordinates. Therefore, it is possible to simplify the calculation to obtain the coordinates from the image which has been imaged.

Furthermore, light emitting elements are disposed at each vertex of a rhombus, and one diagonal line of the diagonal shape is substantially horizontally disposed, so the square and/or root calculations are not needed in order to obtain the diagonal distance and coordinates. Thus, it is possible to simplify the calculation to obtain the coordinates from the image which has been imaged.

Furthermore, a modulating means to modulate the light emitting elements in accordance with the operating information from the operating means and a light receiving means to detect the modulated operating information are provided, so it is possible to operate application software the same way as is done with a mouse, and operations such as page scrolling or the like can be performed, using only the designating tool, during the presentation, and distraction of the flow of the presentation can be avoided.

In addition, a hand detecting means is provided on the designating tool, and turning on and off of the light emitting elements can be controlled, so that it is possible to turn the lights off when it is not being used, and turn the lights on when it is being used. Thus, it is possible to avoid wasting energy, such as batteries, and to have a long life expectancy of the light emitting elements.

Furthermore, the designating tool includes at least three reflecting elements and a reflecting element which is disposed on an orthogonal axis to a plane delineated by the at least three light emitting elements, the relative positional relationship of the reflecting elements irradiated by an irradiating means is imaged by an image pick-up means, and the direction in which the designating tool points with respect to the image pick-up means is obtained from the image signal and is converted to planar coordinates. Therefore, it is possible to use application software of a computer by moving a marker on the screen as the demonstrator moves the designating tool. Because of this, it is possible for the demonstrator to explain items by pointing them out, as if with a laser pointer, without having to leave the view of the audience during a presentation performed by enlarging the image onto a computer screen and projecting it with a projector. Thus, it is possible to prevent the audience from being distracted. Furthermore, the designating tool does not need an energy source, such as a battery, so maintenance management can be easily performed.

Furthermore, the reflecting elements are disposed at each vertex of an isosceles triangle, and the base of the triangle connecting two of the reflecting elements is substantially horizontally disposed, so square and/or root calculations are not needed in order to obtain the diagonal distance and coordinates. Thus, it is possible to simplify the calculation in order to obtain the coordinates from the image which has been imaged.

In addition, the reflecting elements are disposed at each vertex of a rhombus, and one diagonal line of the rhombus is substantially horizontally disposed, so square and/or root calculations are not needed in order to obtain the diagonal distance and coordinates. Thus, it is possible to simplify the calculation to obtain the coordinates from the image which has been imaged.

Furthermore, the designating tool includes a reflecting element of a hollow disk shape which is disposed in a single plane, and a reflecting element which is disposed on an orthogonal axis to the plane delineated by the disk-shaped reflecting element, the relative positional relationship of the reflecting devices which have been irradiated by an irradiating means is imaged by an imaging means, and the direction in which the designating tool points with respect to the imaging means is obtained from the image signal and is converted to planar coordinates. Therefore, it is possible to use the application software of the computer by moving the marker on the screen as the demonstrator moves the designating tool. Because of this, it is possible for the demonstrator to explain items by pointing them out, as if with a laser pointer, without having to leave the view of the audience during a presentation or the like in which an image of a computer screen is enlarged and projected by the projector. Therefore, it is possible to prevent the audience from being distracted. Furthermore, the designating tool does not need an energy source, such as a battery, so the maintenance management can be easily performed. In addition, the reflecting element of the designating tool is radially symmetrical, so it is possible to use the designating tool regardless of the manner in which the demonstrator holds the designating tool.

Furthermore, in a method of the invention, a first image from the first light emitting element or the first reflecting element and a second image from the second light emitting element or the second reflecting element are obtained from an image which has been imaged by the imaging means, reference coordinates are obtained from the coordinates of the first image, the orientation of the designating tool with respect to the imaging means is obtained from the positional relationship of the reference coordinates and the second image, and the designating position on the display means is specified according to the orientation. Therefore, the size of the image which has been imaged is not limited. Even if the distance between the imaging means and the designating tool is not constant, it is possible to specify the designating position on the screen and the demonstrator can move the position. Furthermore, the screen corner of the image pick-up means can be arbitrarily set, so the attachment location of the imaging means is not limited, and adjustments can be easily performed.

In addition, a method is also provided wherein independent designating tool images which are separated from an image of a plurality designating means into independent images are obtained from an image which was imaged by the imaging means, a plurality of images of designating means can be obtained from the independent designating tool images which were divided into independent images, the orientation of each designating means relative to the imaging means is obtained for each independent designating tool image, and the designating position on said display means is specified according to the orientation. Therefore, it is possible to simultaneously point out two or more locations, and simultaneously perform input at two locations on the screen, such as one selected by the demonstrator and one selected by a member of the audience of the presentation.

What is claimed is:

1. A remote coordinate input system for use with a screen, comprising:
    an imaging device that images relative positional relationship between first and second light emitting elements of a designator, said first light emitting element includes at least three light emitting elements, said second light emitting element is arranged on an orthogonal axis to a plane which is composed of said at least three light emitting elements;
    a coordinate converter that obtains an orientation of the designator with respect to said imaging device from an image which is imaged by said imaging device and converts the image to planar coordinates;
    an output device that outputs the planar coordinates that are obtained by the coordinate converter; and
    a display that displays designating information on the screen based on the planar coordinates that are obtained from said output device.

2. The remote coordinate input system of claim 1, each of the at least three first light emitting elements being respectively disposed at each vertex of an isosceles triangle, a base of the isosceles triangle that is formed by connecting two of the at least three first light emitting elements is substantially horizontally arranged.

3. The remote coordinate input system of claim 1, each of the at least three first light emitting elements being respectively arranged at each vertex of a rhombus, one diagonal line of said rhombus being substantially horizontally arranged.

4. The remote coordinate input system of claim 1, further comprising:
    an operator disposed at the designator that provides operating information;
    a modulator that modulates the at least three first light emitting elements or the second light emitting element according to the operating information of the operator; and
    a light receiver that detects the modulation of the at least three first light emitting elements and the second light emitting element.

5. The remote coordinate input system of claim 1, further comprising a hand detector that detects whether the designator is being held by a hand of a user, at least one of lighting and turning off of the light of the first and second light emitting elements being controlled by an output of said hand detector.

6. A remote coordinate input method, comprising the steps of:
    obtaining a first image from a first light emitting element;
    obtaining a second image from a second light emitting element;
    obtaining a reference coordinate from a coordinate of said first image;
    obtaining an orientation of a designator with respect to an imaging device from a positional relationship between the second image and the reference coordinate; and specifying a designating position on a display according to said orientation.

7. The remote coordinates input method of claim 6, further comprising the steps of:

obtaining independent designating tool images in which an image of a plurality of designators are separated into images independent from images which have been imaged by said imaging device;

obtaining an orientation of each designator with respect to the imaging device for each independent designating tool image; and specifying designated positions on the display according to said orientations.

* * * * *